(12) United States Patent
Ueda et al.

(10) Patent No.: US 9,434,094 B2
(45) Date of Patent: Sep. 6, 2016

(54) MOLDING DIE AND METHOD FOR MANUFACTURING SAME

(75) Inventors: Kenichi Ueda, Osaka (JP); Mitsushi Sogabe, Osaka (JP)

(73) Assignee: TANAZAWA HAKKOSHA CO., LTD., Osaka (JP)

( * ) Notice: Subject to any disclaimer, the term of this patent is extended or adjusted under 35 U.S.C. 154(b) by 537 days.

(21) Appl. No.: 13/816,898

(22) PCT Filed: Feb. 21, 2012

(86) PCT No.: PCT/JP2012/054037
§ 371 (c)(1),
(2), (4) Date: Feb. 13, 2013

(87) PCT Pub. No.: WO2012/117881
PCT Pub. Date: Sep. 7, 2012

(65) Prior Publication Data
US 2013/0141792 A1  Jun. 6, 2013

(30) Foreign Application Priority Data

Feb. 28, 2011  (JP) ................................. 2011-043100
Dec. 13, 2011  (JP) ................................. 2011-272065

(51) Int. Cl.
- *B29C 33/42* (2006.01)
- *G02B 1/11* (2015.01)
- *G02B 5/02* (2006.01)
- *B29C 37/00* (2006.01)

(52) U.S. Cl.
CPC ............... *B29C 33/424* (2013.01); *G02B 1/11* (2013.01); *G02B 5/0268* (2013.01); *B29C 37/0053* (2013.01)

(58) Field of Classification Search
CPC ... B29C 37/0053; B29C 33/424; G02B 1/11; G02B 5/0268
USPC ............. 106/38.2, 38.27, 38.22, 38.28, 38.9; 425/470
See application file for complete search history.

(56) References Cited

U.S. PATENT DOCUMENTS 3,668,056 A * 6/1972 Hayes, Jr. ........................ 442/76
4,396,448 A * 8/1983 Ohta ....................... B32B 27/04
                                                      101/16

(Continued)

FOREIGN PATENT DOCUMENTS

JP    53-140364 A    12/1978
JP    11-192637 A    7/1999

(Continued)

*Primary Examiner* — Yogendra Gupta
*Assistant Examiner* — Emmanuel S Luk
(74) *Attorney, Agent, or Firm* — Rabin & Berdo, P.C.

(57) ABSTRACT

A molding die includes a die having a mold plane; and gloss control granules composed of 50 to 80 pbw of a shape retention fixation base material such as a thermosetting resin; 30 to 80 pbw of a diffuse reflecting surface formation core material such as a ceramic powder; and 5 to 10 pbw of a roughness enhancement material such as an inorganic fiber, adhered to the mold plane in a spaced-apart manner. The gloss control granules are each independently adhered in the spaced-apart manner to form gloss control projections on the mold plane of the die so that a surface of a molded product molded on the die forms a surface having a small specular reflection or a diffuse reflection, and the gloss control projections having fine, uneven surfaces with recesses and projections are formed on the mold plane at a coating rate of 40 to 80%.

20 Claims, 7 Drawing Sheets

(56) References Cited

U.S. PATENT DOCUMENTS

| | | | | |
|---|---|---|---|---|
| 5,535,980 A * | 7/1996 | Baumgartner | B29C 33/56 | 106/38.2 |
| 5,705,254 A * | 1/1998 | Morinaga | B29C 33/424 | 219/121.68 |
| 5,705,541 A * | 1/1998 | Awe | C08K 3/34 | 523/220 |
| D410,791 S * | 6/1999 | Alfonso | | D5/62 |
| 5,916,502 A * | 6/1999 | Niwa | B44C 1/175 | 101/177 |
| D419,778 S * | 2/2000 | Alfonso | | D5/44 |
| 6,077,472 A * | 6/2000 | Kataoka | B29C 45/0025 | 264/219 |
| 6,078,775 A * | 6/2000 | Arai | G03G 15/162 | 399/302 |
| 6,129,971 A * | 10/2000 | Brandt | A61L 15/26 | 427/257 |
| D448,180 S * | 9/2001 | Alfonso | | D5/99 |
| 6,458,312 B1 * | 10/2002 | Sumi | B29C 49/0005 | 264/129 |
| 8,012,252 B2 * | 9/2011 | Engler | C09D 1/00 | 106/287.11 |
| 8,579,013 B2 * | 11/2013 | Bewlay | C04B 28/06 | 106/38.9 |
| 2004/0091715 A1 * | 5/2004 | Pickering | C08L 27/18 | 428/421 |
| 2004/0202863 A1 * | 10/2004 | Saito | B41J 2/14 | 428/411.1 |
| 2005/0133962 A1 * | 6/2005 | Mumme | B29C 33/3828 | 264/334 |
| 2006/0102050 A1 * | 5/2006 | Lu | B29C 33/64 | 106/38.22 |
| 2007/0169667 A1 * | 7/2007 | Lu | C09D 183/04 | 106/38.22 |
| 2008/0178767 A1 * | 7/2008 | Margaria | B22D 13/102 | 106/38.27 |
| 2009/0242112 A1 * | 10/2009 | Taeger | B23K 26/0084 | 156/272.8 |
| 2009/0285927 A1 * | 11/2009 | Ueno | B29C 33/62 | 425/436 R |
| 2010/0097705 A1 * | 4/2010 | Furui | B29D 11/0073 | 359/599 |
| 2010/0227943 A1 * | 9/2010 | Coretsopoulos | C09D 4/00 | 522/182 |
| 2010/0297344 A1 * | 11/2010 | Laudenklos | B22C 3/00 | 427/135 |
| 2011/0250363 A1 * | 10/2011 | Komatsubara | B22D 17/2007 | 427/475 |
| 2012/0141734 A1 * | 6/2012 | Lee | G02B 5/0268 | 428/141 |
| 2013/0088784 A1 * | 4/2013 | Kojima | B29C 33/424 | 359/601 |
| 2013/0141792 A1 * | 6/2013 | Ueda | B29C 33/424 | 359/599 |
| 2013/0224066 A1 * | 8/2013 | Bewlay | B22C 9/04 | 420/417 |

FOREIGN PATENT DOCUMENTS

| | | |
|---|---|---|
| JP | 2007-160637 A | 6/2007 |
| JP | 2007-286417 A | 11/2007 |
| JP | 3144782 U | 9/2008 |

\* cited by examiner (A)

(B)

MOLDING DIE AND METHOD FOR MANUFACTURING SAME

TECHNICAL FIELD

This invention relates to a molding die, a manufacturing method therefor, and a method for matching the glossiness of molded articles, and, in particular, to a molding die for resin molding, which is used, for example, when a resin molded article having a surface provided with a texture pattern (such as a leather emboss pattern, a grain pattern, a wood emboss pattern, a pear pattern, a leaf vein pattern, a scale pattern, a marble pattern, a hair-line, a geometric pattern, a polishing pattern, or a painting pattern) which arranges a molded surface for improving a product design is manufactured; to a manufacturing method therefor; and to a method for matching the glossiness of molded articles.

BACKGROUND ART

Gloss reduction treatment has been conventionally performed by pear grains due to etching finishing or by sandblast finishing, to roughen the mold plane of a die. In addition, in the case of even so being insufficient, painting, also serving as masking of a poor appearance, has been conventionally applied to a molded article.

CITATION LIST

Patent Literature

Patent Literature 1: Japanese Patent Laid-Open No. 2007-160637

SUMMARY OF INVENTION

Technical Problem

Generally, a synthetic resin molded article having a sense of quality and a poor appearance hard to see is desired, and a molded article with a reduced luster, which contributes to it, is desired. In addition, a synthetic resin molded article which can reduce a luster to prevent window glare is desired for a synthetic resin molded article for an automotive interior, especially an instrument panel around a window, or the like.

Also, there is a demand for matching the glosses of the surfaces of molded articles molded with materials such as different synthetic resins.

Therefore, an object of this invention is to provide a molding die by which a molded article with a reduced luster can be molded; and a manufacturing method therefor.

Another object of this invention is to provide a method for matching the glossiness of molded articles, by which the glosses of the surfaces of the molded articles molded with materials such as different synthetic resins can be matched; a molding die; and a manufacturing method therefor.

Solution to Problem

In a molding die according an aspect of the invention
gloss control granules comprise 50 to 80 parts by weight of a shape retention fixation base material, 30 to 80 parts by weight of a diffuse reflecting surface formation core material, and 5 to 10 parts by weight of a roughness enhancement material are adhered to a mold plane of a die at spacings;
the gloss control granules are each independently added at spacing to form gloss control projections on the mold plane of the die so that a surface of a molded product molded on the mold plane of the die adhered with the gloss control granules forms a surface with small specular reflection or diffuse reflection; and
the gloss control projections having fine, uneven surfaces with recesses and projections are formed at a coating rate of 40 to 80% on the mold plane.

In a molding die according another aspect of the invention
gloss control granules comprise 50 to 80 parts by weight of a shape retention fixation base material, 30 to 80 parts by weight of a diffuse reflecting surface formation core material, and 5 to 10 parts by weight of a roughness enhancement material are adhered to a mold plane of a die at spacings;
the gloss control granules are each independently added at spacing to form gloss control projections on the mold plane of the die so that a surface of a molded product molded on the mold plane of the die adhered with the gloss control granules forms a surface with small specular reflection or diffuse reflection; and
in the gloss control granules, the gloss control projections having fine, uneven surfaces with recesses and projections, having strength for enduring molding, are formed with the shape retention fixation base material, and, in the gloss control projections, differently shaped bodies constituted by approximately bell-like bodies, approximately hanging bell-like bodies, approximately discal bodies, and approximately dice-like bodies as well as approximately hemispheroidal bodies, approximately oblate-hemispheroidal bodies, and approximately prolate-hemispheroidal bodies cut along planes crossing spherical surfaces having spherical, ellipsoidal, and cocoon shapes, and polyhedrons including truncated cubes, cuboctahedrons, and twisted cubes are formed and fine projections protruding from the differently shaped bodies are formed with the roughness enhancement material and/or the diffuse reflecting surface formation core material.

In the molding die according to still another aspect of the invention, the shape retention fixation base material is thermosetting plastic; the diffuse reflecting surface formation core material is a ceramic powder having a random shape; and the roughness enhancement material is an inorganic fiber.

In the molding die according to the above further aspect of the invention, the roughness enhancement material is one of glass fibers, carbon fibers, silicon carbide fibers, and potassium titanate fibers and has a fiber length of 5 to 20 μm; and the diffuse reflecting surface formation core material has a grain diameter of 0.1 to 20 μm.

In another aspect of the invention, the gloss control granule has a grain diameter of 1.0 to 100 μm and a height of 5 to 30 μm.

In a still further aspect of the invention, the gloss control granule is formed by spray-solidifying a composite material in which 50 to 80 parts by weight of a synthetic resin, 30 to 80 parts by weight of a ceramic powder, and 5 to 10 parts by weight of an inorganic fiber are diluted with 30 to 90 parts by weight of a diluting solvent.

In a further aspect of the invention, the surface of the die is a region other than the gloss control projections having the fine, uneven surfaces with recesses and projections; and a recesses-and-projections-like pattern of the mold plane of the die appears between the respective gloss control granules.

A method for manufacturing a molding die according to another aspect of the invention includes (1) a recesses-and-projections-like pattern finishing step of performing finishing for forming a recesses-and-projections-like pattern on a molding die;

(2) a composite material mixing step of mixing 50 to 80 parts by weight of a shape retention fixation base material, 30 to 80 parts by weight of a diffuse reflecting surface formation core material, 5 to 10 parts by weight of a roughness enhancement material, and 30 to 90 parts by weight of a solvent;

(3) a spraying step of spraying the composite material in form of a fine liquid mist on a mold plane of the die by compressed air to have a coating rate of 40 to 80% on the mold plane; and (4) a partial adhesion step of heating-solidifying at 100 to 150° C. the composite material sprayed on the mold plane of the die to add gloss control granules having fine, uneven surfaces with recesses and projections at a coating rate of 40 to 80% on the mold plane, wherein, on the mold plane of the die, the gloss control granules are added so that a surface of a molded product molded on the mold plane of the die adhered with the gloss control granules forms a surface with small specular reflection or diffuse reflection, and the gloss control projections having fine, uneven surfaces with recesses and projections are formed at a coating rate of 40 to 80% on the mold plane.

In another aspect of the method of the invention, the shape retention fixation base material is thermosetting plastic; the diffuse reflecting surface formation core material is a ceramic powder having a random shape; and the roughness enhancement material is an inorganic fiber.

In still another aspect of the method of the invention, the roughness enhancement material is one of glass fibers, carbon fibers, silicon carbide fibers, and potassium titanate fibers and has a fiber length of 5 to 20 µm; and the diffuse reflecting surface formation core material has a grain diameter of 0.1 to 20 µm.

In yet another aspect of the method of the invention, the gloss control granule has a grain diameter of 1.0 to 100 µm and a height of 5 to 30 µm.

In the molding die of the invention, gloss control granules may comprise 50 to 80 parts by weight of a synthetic resin, 30 to 80 parts by weight of a ceramic powder, and 5 to 10 parts by weight of an inorganic fiber are adhered to a mold plane of the die at spacings;

on the mold plane of the die, the gloss control granules are added so that a gloss level of a surface of a molded product molded on the mold plane of the die adhered with the gloss control granules matches and/or harmonizes with that of a surface of another molded product; and the gloss control projections having fine, uneven surfaces with recesses and projections are formed at a coating rate of 40 to 80% on the mold plane.

In yet another aspect of the invention, the shape retention fixation base material is thermosetting plastic; the diffuse reflecting surface formation core material is a ceramic powder having a random shape; and the roughness enhancement material is an inorganic fiber.

In still another aspect of the invention, the roughness enhancement material is one of glass fibers, carbon fibers, and silicon carbide fibers and has a fiber length of 5 to 20 µm; and the diffuse reflecting surface formation core material has a grain diameter of 0.1 to 20

In another aspect of the invention, the gloss control granule has a grain diameter of 1.0 to 100 µm and a height of 5 to 30 µm.

A method for manufacturing a molding die according another aspect of the invention comprises (1) a recesses-and-projections-like pattern finishing step of performing finishing for forming a recesses-and-projections-like pattern on a molding die;

(2) a composite material mixing step of mixing a composite material comprising 50 to 80 parts by weight of a shape retention fixation base material, 30 to 80 parts by weight of a diffuse reflecting surface formation core material, 5 to 10 parts by weight of a roughness enhancement material, and 30 to 90 parts by weight of a solvent;

(3) a spraying step of spraying the composite material in form of a fine liquid mist on a mold plane of the die by compressed air to have a coating rate of 40 to 80% on the mold plane so that, in order to match and/or harmonize a gloss level of a surface of a first molded product on which fine, uneven recesses and projections are molded with a gloss level of a surface of another second molded product to be compared, the gloss level(s) of either or both of the first molded product and the second molded product are reduced; and (4) an adhesion step of heating-solidifying at 100 to 150° C. the composite material sprayed on the mold plane of the die to add gloss control granules at a coating rate of 40 to 80% on the mold plane, wherein, on the mold plane of the die formed by the steps, the gloss control granules are added so that the gloss level of the surface of the first molded product molded on the mold plane of the die adhered with the gloss control granules matches and/or harmonizes with the gloss level of the surface of the other second molded product, and the gloss control projections having fine, uneven surfaces with recesses and projections are formed at a coating rate of 40 to 80% on the mold plane.

In a method for manufacturing a molding die according another aspect of the invention, the mold plane of the die for molding the first molded product molded with a non-crystalline resin or a crystalline resin of which a type is different from that of a resin constituting the second molded product to match and/or harmonize with the gloss level of the surface of the second molded product molded with a crystalline resin or a non-crystalline resin is constituted by the mold plane of the die adhered with the gloss control granules.

In another aspect of the manufacturing method of the invention, the shape retention fixation base material is thermosetting plastic; the diffuse reflecting surface formation core material is a ceramic powder having a random shape; and the roughness enhancement material is an inorganic fiber.

In the manufacturing method of the invention according to another aspect, the roughness enhancement material is one of glass fibers, carbon fibers, silicon carbide fibers, and potassium titanate fibers and has a fiber length of 5 to 20 µm; and the diffuse reflecting surface formation core material has a grain diameter of 0.1 to 20 µm.

In the method, the gloss control granule may have a grain diameter of 1.0 to 100 µm and a height of 5 to 30 µm.

A synthetic resin molded article according another aspect of the invention, includes gloss control granules comprising 50 to 80 parts by weight of a shape retention fixation base material, 30 to 80 parts by weight of a diffuse reflecting surface formation core material, and 5 to 10 parts by weight of a roughness enhancement material are adhered to a mold plane of a die at spacings; and the gloss control granules are each independently added at spacing to form gloss control projections having fine, uneven surfaces with recesses and projections on the mold plane of the die at a coating rate of 40 to 80% on the mold plane so that a surface of a molded product molded on the mold plane of the die adhered with the gloss control granules forms a surface with small specular reflection or diffuse reflection, wherein gloss control recesses having fine, uneven surfaces with recesses and projections, in which the gloss control projections having fine, uneven surfaces with recesses and projections of the molding die are reversed, are formed;

in the gloss control recesses, differently shaped recesses constituted by approximately bell-like, approximately hanging bell-like, approximately discal, and approximately dice-like ones as well as approximately hemispheroidal, approximately oblate-hemispheroidal, and approximately prolate-hemispheroidal ones cut along planes crossing spherical surfaces having spherical, ellipsoidal, and cocoon shapes, and polyhedron-like ones including truncated cube-like, cuboctahedron-like, and twisted cube-like ones are formed, and fine recesses dented from surfaces of the differently shaped recesses are formed; and a surface with small specular reflection or diffuse reflection is formed.

According to a synthetic resin molded article in an aspect of the invention, gloss control granules comprise 50 to 80 parts by weight of a shape retention fixation base material, 30 to 80 parts by weight of a diffuse reflecting surface formation core material, and 5 to 10 parts by weight of a roughness enhancement material are adhered to a mold plane of a die at spacings;

the gloss control granules are each independently added at spacing on the mold plane of the die so that a surface of a molded product molded on the mold plane of the die adhered with the gloss control granules forms a surface with small specular reflection or diffuse reflection;

in the gloss control granules, the gloss control projections having fine, uneven surfaces with recesses and projections, having strength for enduring molding, are formed with the shape retention fixation base material, and, in the gloss control projections, differently shaped bodies constituted by approximately bell-like bodies, approximately hanging bell-like bodies, approximately discal bodies, and approximately dice-like bodies as well as approximately hemispheroidal bodies, approximately oblate-hemispheroidal bodies, and approximately prolate-hemispheroidal bodies cut along planes crossing spherical surfaces having spherical, ellipsoidal, and cocoon shapes, and polyhedrons including truncated cubes, cuboctahedrons, and twisted cubes are formed and fine projections protruding from the differently shaped bodies are formed with the roughness enhancement material and/or the diffuse reflecting surface formation core material;

the synthetic resin molded article is molded by a molding die;

gloss control recesses having fine, uneven surfaces with recesses and projections, in which the gloss control projections having fine, uneven surfaces with recesses and projections of the molding die are reversed, are formed;

in the gloss control recesses, differently shaped recesses constituted by approximately bell-like, approximately hanging bell-like, approximately discal, and approximately dice-like ones as well as approximately hemispheroidal, approximately oblate-hemispheroidal, and approximately prolate-hemispheroidal ones cut along planes crossing spherical surfaces having spherical, ellipsoidal, and cocoon shapes, and polyhedron-like ones including truncated cube-like, cuboctahedron-like, and twisted cube-like ones are formed, and fine recesses dented from surfaces of the differently shaped recesses are formed; and a surface with small specular reflection or diffuse reflection is formed.

In another aspect of the synthetic resin molded article of the invention, the shape retention fixation base material is thermosetting plastic; the diffuse reflecting surface formation core material is a ceramic powder having a random shape; and the roughness enhancement material is an inorganic fiber.

In yet another aspect of the synthetic resin molded article of the invention, a recess surface corresponding to a shape of an end of the diffuse reflecting surface formation material and/or the roughness enhancement material is formed on the gloss control recesses having fine, uneven surfaces with recesses and projections formed on the surface of the molded article.

In another aspect the synthetic resin molded article has a recesses-and-projections-like pattern on a surface which is a basal surface (foundation surface) of the die appears on a region other than the gloss control projections having fine, uneven surfaces with recesses and projections in the surface of the molding die; and a recesses-and-projections-like pattern in which the recesses-and-projections-like pattern of the molding die is reversed is formed on a region other than the gloss control recesses having fine, uneven surfaces with recesses and projections in the surface of the molded product.

A method for matching glosses of molded articles according to another aspect of the invention includes (1) a spraying step of spraying a composite material, in which 50 to 80 parts by weight of a shape retention fixation base material, 30 to 80 parts by weight of a diffuse reflecting surface formation core material, 5 to 10 parts by weight of a roughness enhancement material, and 30 to 90 parts by weight of a solvent are mixed, in form of a fine liquid mist on a mold plane of a die by compressed air to have a coating rate of 40 to 80% on the mold plane; and (2) an adhesion step of adding granules at a coating rate of 40 to 80% on the mold plane so that, in order to match and/or harmonize a glossiness of a surface of a first molded product on which fine, uneven recesses and projections are molded with a glossiness of a surface of another molded product with a different type of a synthetic resin to be compared, the glossiness of either or both of the molded products are reduced, the method further comprising:

a coated die basic data acquisition step of measuring glossiness of mold planes of dies with varied coating rates of the granules;

a molded article basic data acquisition step of measuring glossiness of molded articles molded with different types of synthetic resins by the dies with the varied coating rates of the granules; and a confirmation step of confirming whether or not the glossiness of the molded articles molded with the different types of the synthetic resins are targeted glossiness and harmonized with each other.

Advantageous Effects of Invention

The molding die according to certain aspects of the invention enables molding of a molded article having a low gloss (glossiness) without depending on the type of a molding resin.

In addition, grains on the mold plane of an original molding die are not damaged and application for controlling a luster is easy.

Even when it becomes needless, it can be easily peeled by a sandblast since the adhesion area of granules adhered to the mold plane of the molding die is small.

Complicated recesses and projections, which have not been obtained by conventional finishing, can be obtained on the mold plane of the molding die.

In the molding die according to other aspects of the invention, a molded article having a low gloss (glossiness) can be molded without depending on the type of a molding resin, the gloss (glossiness) of the surface of a molded article molded by the molding die is low, and the glosses (glossiness) of molded articles molded with different resins can be matched.

In the synthetic resin molded article according to other aspects of the invention, when light is incident on the surface of the synthetic resin molded article, the incident light is reflected by the fine surfaces with recesses and projections of the inner surfaces of gloss control recesses and becomes diffused light. Since the incident light is reflected diffusely, reflected light reaching the eyes of an observer is reduced. Since a lot of "gloss control recesses having fine surfaces with recesses and projections on inner surfaces" as mentioned above are formed on the surface of the molded article, the glossiness of the whole synthetic resin molded article is reduced.

The above-mentioned object, other object, features, and advantages of this invention will be further clarified by the explanation of the best mode for carrying out the invention below with reference to the drawings.

REFERENCE SIGNS LIST

Figure 1:
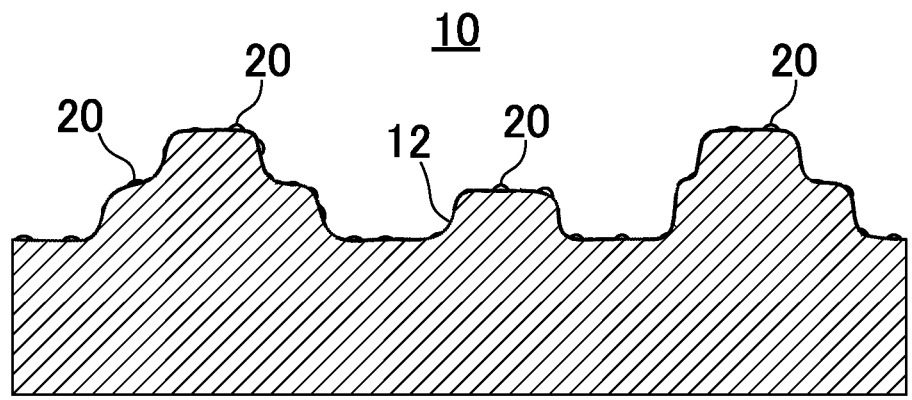
FIG. 1 is a cross-sectional view of a molding die according to one embodiment of the present invention.
Figure 2:
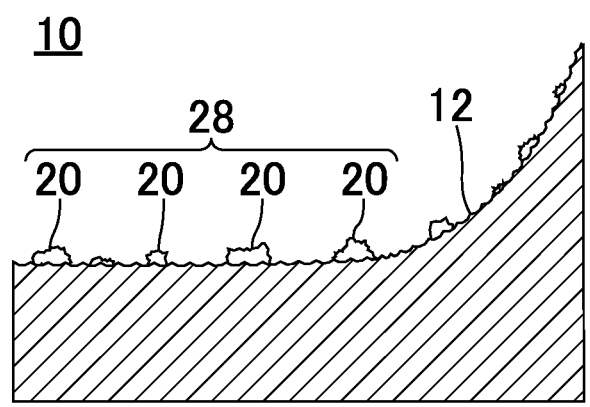
FIG. 2 is an enlarged cross-sectional view of the mold plane of the die.

10 Die
12 Mold
20 Granule
22 Synthetic resin
24 Ceramic powder
26 Inorganic fiber
28 Gloss control projection
110 Synthetic resin molded article
112 Gloss control recess

DESCRIPTION OF EMBODIMENTS (Die and Manufacturing Method Therefor)

FIG. 1 is a cross-sectional view of a molding die 10 according to one embodiment of the present invention.

In the molding die 10 according to this invention, granules 20 comprising, for example, 50 to 80 parts by weight of a synthetic resin 22 which is a shape retention fixation base material which retains the shapes of granules, for example, 30 to 80 parts by weight of a ceramic powder 24 which is a diffuse reflecting surface formation core material for forming a diffuse reflecting surface, and, for example, 5 to 10 parts by weight of an inorganic fiber 26 which is a roughness enhancement material which enhances the roughness of grains are each independently adhered to the mold plane 12 of the die 10 at spacings.

The granules 20 are added on the mold plane 12 of the die 10 so that the surface of a molded product molded on the mold plane 12 of the die 10 adhered with the granules 20 forms a surface with small specular reflection or diffuse reflection, and gloss control projections 28 having fine, uneven surfaces with recesses and projections, comprising the granules 20, are formed at a coating rate of 40 to 80% on the mold plane 12.

The granule 20 is formed by spray-solidifying, on the mold plane 12 of the die 10, a composite material in which 50 to 80 parts by weight of the synthetic resin 22, 30 to 80 parts by weight of the ceramic powder 24, and 5 to 10 parts by weight of the inorganic fiber 26 are diluted with 30 to 90 parts by weight of a diluting solvent.

Figure 3A:
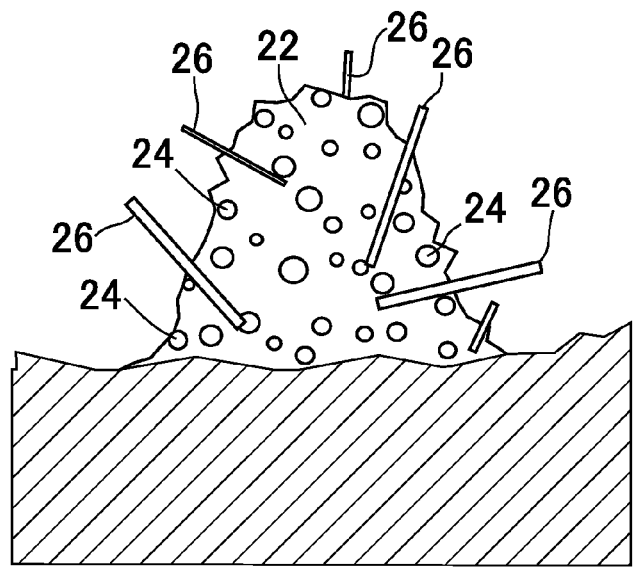
FIG. 3A is an enlarged cross-sectional view of a granule.
Figure 3B:
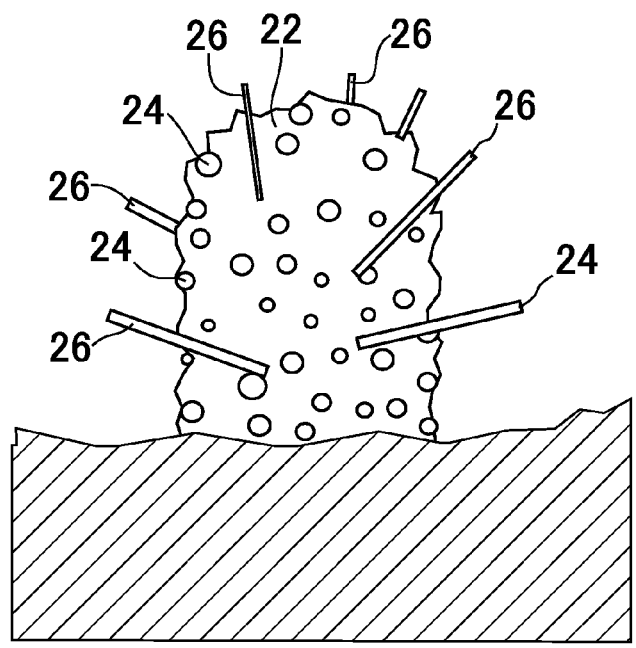
FIG. 3B is an enlarged cross-sectional view of a granule.
Figure 3C:
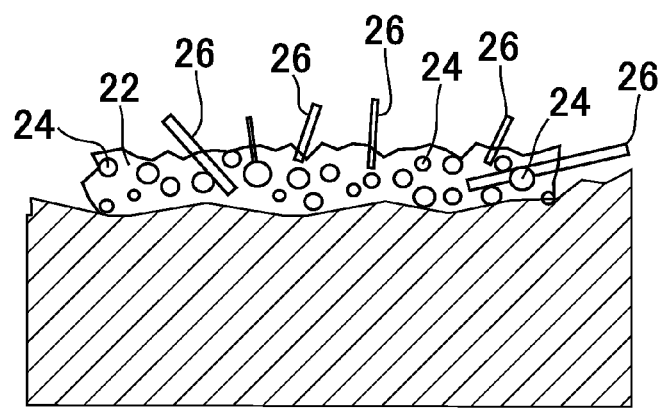
FIG. 3C is an enlarged cross-sectional view of a granule.
Figure 3D:
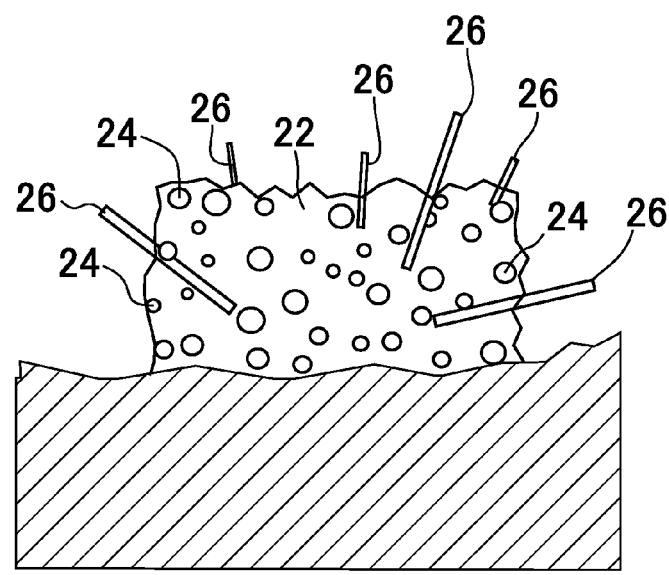
FIG. 3D is an enlarged cross-sectional view of a granule.
Figure 3E:
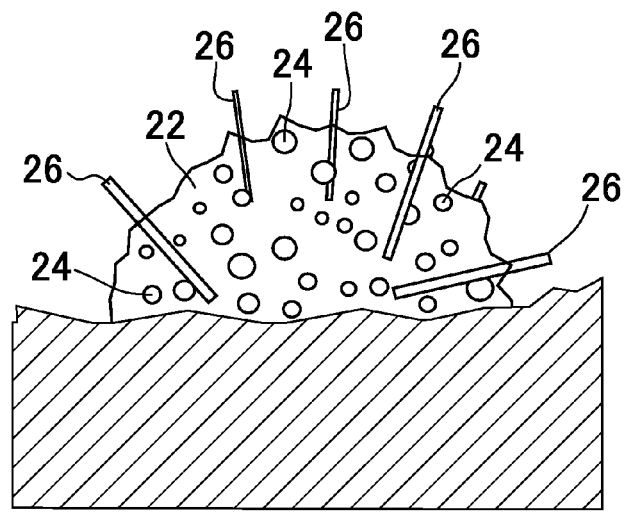
FIG. 3E is an enlarged cross-sectional view of a granule.
Figure 3F:
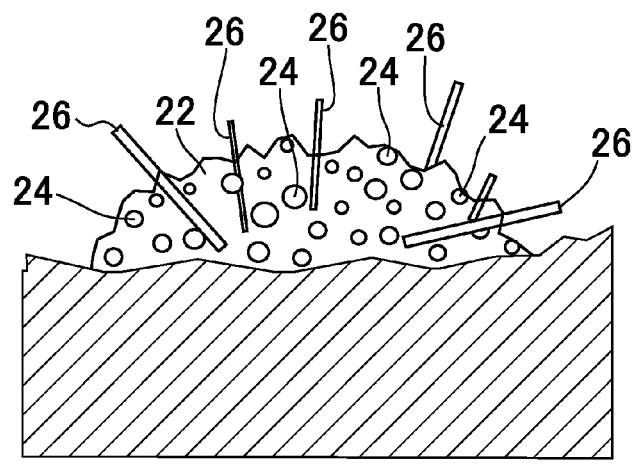
FIG. 3F is an enlarged cross-sectional view of a granule.
Figure 3G:
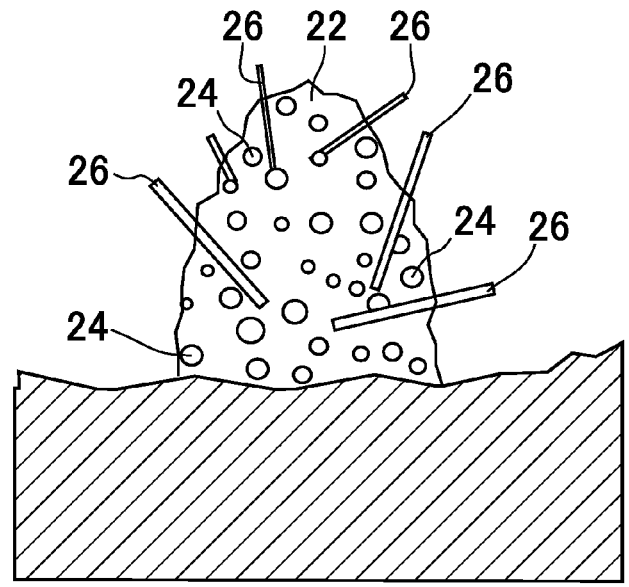
FIG. 3G is an enlarged cross-sectional view of a granule.
Figure 3H:
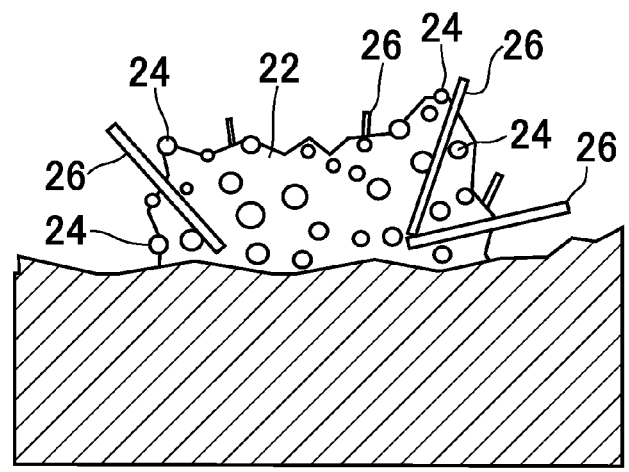
FIG. 3H is an enlarged cross-sectional view of a granule.
Figure 4:
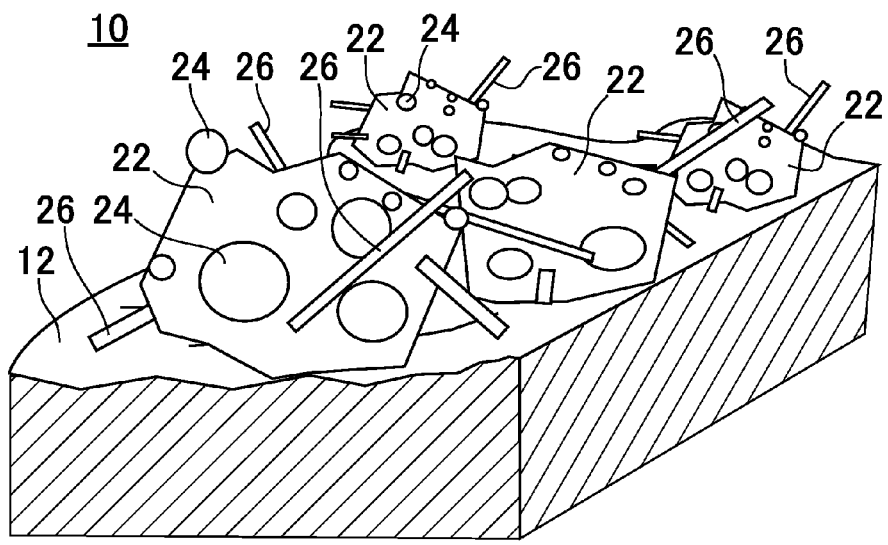
FIG. 4 is an enlarged cross-sectional view of a granule.

The granules 20 for controlling a gloss constitute the gloss control projections 28 having fine, uneven surfaces with recesses and projections, having strength for enduring molding. In the gloss control projections 28, differently shaped bodies constituted by approximately bell-like bodies (see FIG. 3A), approximately hanging bell-like bodies (see FIG. 3B), approximately discal bodies (see FIG. 3C), and approximately dice-like bodies (see FIG. 3D) as well as approximately hemispheroidal bodies (see FIG. 3E), approximately oblate-hemispheroidal bodies (see FIG. 3F), and approximately prolate-hemispheroidal bodies (see FIG. 3G) cut along planes crossing spherical surfaces having spherical, ellipsoidal, and cocoon shapes, and polyhedrons (see FIG. 3H) including truncated cubes, cuboctahedrons, and twisted cubes are formed with the shape retention fixation base material. Further, in the gloss control projections 28, fine projections protruding from the differently shaped bodies are formed with the roughness enhancement material and/or the diffuse reflecting surface formation core material.

In the molding die 10 according to the present invention, not a specular surface but a recesses-and-projections-like pattern is formed on the mold plane 12 which is a basal surface (foundation surface).

For example, a recesses-and-projections-like pattern such as a leather emboss, a pear emboss, or a geometric emboss is formed on the mold plane 12 of the molding die 10 by etching.

A surface shape corresponding to the mold plane 12 of the die 10 is applied to the surface of a molded article by the die 10 having the recesses-and-projections-like mold plane 12. The surface shape is referred to as a leather texture, a pear texture, a geometric texture, or the like, depending on the shape of this surface with recesses and projections.

The leather texture refer to a wrinkle pattern seen on a leather surface and is formed on an automotive interior or the like, e.g., a molded article such as a steering wheel, a console box, a meter panel, a dash board, or a side molding, as a product given the leather grains.

The pear texture refer to such fine recesses and projections as seen on the surface of a pear and is formed on a household electrical appliance exterior or the like, e.g., a molded article such as a TV, an air conditioner panel grille, a refrigerator panel, or a washing machine panel, as a product given the pear texture.

A recesses-and-projections-like pattern may be also given to the mold plane 12 of die 10 by a method other than etching finishing, and a rough polished surface, a planar polished surface, a hair-line, or the like may be also formed, for example, by engraving, machining, or polishing marks. In addition, for example, a specular surface to which any recesses-and-projections-like pattern is not given may be also partially present on the mold plane 12 of the die 10.

Metals used in the die 10 are not only steel materials such as pre-hardened steels, hardened steels, precipitation-hardened steels, and stainless steels but also nonferrous metals such as zinc alloys, aluminum alloys, and beryllium copper alloys. In addition, carbon and ceramic are also used in the die 10 without limitation thereto in accordance with the present invention.

The mold plane 12 of the die 10 is subjected to sandblast treatment after finishing of giving a recesses-and-projections-like pattern of, e.g., emboss such as leather emboss, geometric emboss, and pear emboss. Such emboss include leather texture patterns, skin texture patterns, wood texture patterns, pear patterns, leaf vein patterns, scale patterns, marble patterns, hair-lines, geometric textures, polishing patterns, painting patterns, and the like.

On the mold plane 12 of the die 10, the adhesiveness of the synthetic resin 22 of the composite material is improved by an anchor effect due to a shape with recesses and projections formed by the sandblast treatment.

Remaining oxides on the surface of the mold plane 12 of the die 10 can be removed to control an applied surface by performing the sandblast treatment.

In addition, corona discharge, ultraviolet light irradiation, radiation irradiation, or the like may be also performed as surface treatment of the die 10. The treatment enables, e.g., improvement in adhesiveness.

The synthetic resin 22 forms the granules 20 constituting the gloss control projections 28, is intended to adhere the granules 20 to the surface of the mold plane 12 of the die 10, and constitutes the shape retention fixation base material of the granules 20.

The synthetic resin 22 used in the composite material requires heat resistance, mold release characteristics, adhesiveness with the mold plane 12 of the die 10, abrasion resistance, and the like. For the heat resistance, one which is not melted at least 150° C. is desirable. For the abrasion resistance, one having sufficient resistance to flow of a molten material of a resin during injection-molding, such as a polypropylene resin or an ABS resin (acrylonitrile-butadiene-styrene copolymer) is desirable. For example, one which can endure molding at 1000 shots or more during molding with the synthetic resin, for example, injection-molding, is desirable. This is because a lot of molded articles are manufactured by the same die 10 when the molded articles are manufactured.

The tensile strength of the synthetic resin 22 is preferably 30 to 120 MPa from the viewpoint of endurance against pressure from a molten resin during molding, desirably, more preferably 50 to 70 MPa from the viewpoint of durability and the easiness of peeling when it becomes needless.

The synthetic resin 22 preferably has a curing temperature of 70 to 200° C. from the viewpoint of preventing the deformation of the die 10 due to warming, desirably, more preferably, 80 to 150° C. from the viewpoint of productivity.

The possibility of the deformation of the die 10 can be eliminated by heating the die 10 at a temperature of 200° C. or less to cure the synthetic resin 22. To that end, it is necessary to select a synthetic resin having a minimal curing temperature. When a synthetic resin having a low curing temperature is selected, the granules 20 for controlling a gloss can be added to the die 10 formed with a low-melting-point metal material.

Such synthetic resins 22 suitable for them include the following ones.

Thermoplastics include polyacetal resins, polyamide resins, polyethylene resins, polypropylene resins, and fluorine resins, which are crystalline plastics.

Thermoplastics include ABS resins, AS resins, acrylic resins, polycarbonate resins, and vinyl chloride resins, which are non-crystalline plastics.

Thermosetting plastics include epoxy resins, polyimide resins, polyamide-imide resins, polyester resins, melamine resins, urea resins, and phenolic resins.

In addition, there are polyurethane resins, silicone resins, phthalic acid-based resins, styrol-based resins, cellulose-based resins, and vinyl acetate resins.

For the resin used in the composite material, one selected from these synthetic resins 22 or resins in which they are combined are used.

Preferred is an epoxy resin, a polyimide resin, a polyamide-imide resin, a fluorine resin, or a mixture thereof.

The epoxy resins include bisphenol A type, ones in which novolac is used, ones in which cyclopentadiene and cyclohexene derivatives are used, and the like. The polyimide resins include polyamino bismaleimide, bismaleimide-triazine resins, and the like.

The polyamide-imide resins include ones synthesized from trimellitic acid and pyromellitic acid; and the like. The fluorine resins include polyfluoroethylene, ethylene fluoride-propylene copolymers, polychlorotrifluoroethylene, polyvinylidene fluoride, and the like.

The ceramic powder 24 constitutes a diffuse reflecting surface formation core material for forming not regular reflection but a diffuse reflecting surface, by which incident light is diffused in every direction, on the surface of a synthetic resin molded article 110 molded using the die 10. The ceramic powder 24 has the function of complicating the surfaces of the granules 20 constituting the gloss control projections 28 to increase a surface area, to increase surface roughness, and to raise the recesses and projections of the surface.

Furthermore, the ceramic powder 24 also has the role of increasing the hardness of the shape retention fixation base material (synthetic resin 22) to control viscosity during spraying.

As a material of the ceramic powder 24, for example, a particulate matter such as alundum (alumina, $Al_2O_3$) or titanium dioxide ($TiO_2$) is used, and, further, hollow glass beads may be also mixed.

The ceramic powder 24 preferably has a grain diameter of 0.1 to 20 μm, desirably, more preferably 10 to 15 μm, for not affecting a recesses-and-projections-like pattern such as a grain pattern finished on a mold plane. When the mixing ratio of the ceramic powder 24 is not more than 30 parts by weight, the synthetic resin 22 drips to prevent the granules 20 from being formed on the mold plane 12 of the die 10.

The ceramic powder 24 having not a homogeneous spherical shape but a random shape is used, and the surface of a molded article having a random shape in which the surface shape of the ceramic powder 24 is reversed can be formed by blending the ceramic powder 24 when molding with the synthetic resin 22 is performed using the die 10.

As a core material for granulation of a composite material by spraying, the ceramic powder 24 increases its viscosity to improve the adhesiveness of the granules 20 with the mold plane 12 of the die 10.

When the synthetic resin 22 constituting a shape retention fixation base material is transparent, the ceramic powder 24 has the function of coloring the synthetic resin 22 to enable visual inspection of the amount of a sprayed composite material which forms the granules 20.

The inorganic fiber 26 is contained to form not regular reflection but a diffuse reflecting surface, by which incident light which is incident is diffused in every direction, on the surface of a synthetic resin molded article 110 molded using the die 10 and to enhance the roughness of the granules 20.

The inorganic fiber 26 constituting a roughness enhancement material is one of glass fibers, carbon fibers, silicon carbide fibers, and potassium titanate fibers and has a fiber length of 5 to 20 μm.

By blending the inorganic fiber 26, not only the strength of the synthetic resin 22 constituting a shape retention fixation base material is improved, but also the granules 20 constituting the gloss control projections 28 form a rugged, irregular, complicated surface.

When the synthetic resin molded article 110 is molded with the synthetic resin using the die 10 on which the granules 20 blended with the inorganic fiber 26 are formed, gloss control recesses 112 in which the surface shapes of the granules 20 are reversed are formed in the synthetic resin molded article 110. Thereby, an irregular, complicated surface is formed in the synthetic resin molded article 110.

It is necessary for the inorganic fiber 26 to have such bending resistance that a site protruding from the solidified site of the synthetic resin 22 constituting a shape retention fixation base material is hardly bent by flow of the resin for molding when the synthetic resin is molding-finished using this die 10.

The mean fiber length of the inorganic fiber 26 is preferably 5 to 20 μm from the viewpoint of maintaining high rigidity and impact strength characteristics, further preferably 10 to 20 μm for preventing the fiber from being peeled off during molding.

The inorganic fiber 26 may be exemplified by a glass fiber, a carbon fiber, a silicon carbide (SiC) fiber, potassium titanate ($K_2O.8TiO_2$), or the like. These exemplified inorganic fibers 26 may be used as a simple substance or may be used in combination at a certain ratio.

It is necessary for the inorganic fiber 26 to have strength for inhibiting breaking when a composite material for forming the granules 20 is kneaded and during molding. The inorganic fiber 26 also serves as a reinforcing material for the synthetic resin 22. Like the ceramic powder 24, when the synthetic resin 22 is transparent, it also has the function of coloring the synthetic resin 22 to enable visual inspection of the amount of a sprayed composite material which forms the granules 20.

Such a molding die 10 is produced by preparing a composite material by mixing materials including the synthetic resin 22, the ceramic powder 24, and the inorganic fiber 26 and diluting the resultant with a solvent (30 to 90 parts by weight), by making the composite material have an adequate viscosity, and by spraying the composite material (spraying method).

The die 10 is produced by coating the mold plane 12 of the die 10 with the granules 20 comprising the composite material.

States of dilution with the solvent include a dispersion (e.g., colloidal) state or a dissolved state.

The synthetic resin 22 is in a liquid state or in a paste state (putty state) having a high viscosity and is diluted with a diluting solvent into a state suitable for spraying.

As the diluting solvent, an organic solvent that slowly volatilizes, such as, for example, cellosolve or cyclohexane is used.

The physical properties of the composite material at ordinary temperature are as follows:

Tensile strength: 40 to 70 MPa;
Compressive strength: 140 to 180 MPa;
Bending strength: 100 to 130 MPa;
Impact strength: 4 to 7 $KJ/m^2$; and
Hardness: 90 to 120 HRM.

In comparison between the cases of mixing and not mixing the inorganic fiber 26, the tensile strength and hardness of the composite material are higher by almost around 10% in the case of mixing it.

As methods of coating the mold plane 12 of the die 10 with the composite material, methods of spraying the composite material are suitable without limitation thereto. A spraying method is desirable from the viewpoint of productivity. This is because the grain diameters of the granules 20 and the like can be optimized.

The granules 20 sprayed in the form of a fine liquid mist by the spraying method are solidified by the surface tension of the diluting solvent and are adhered to the basal surface (foundation surface) of the die 10.

The granules 20 sprayed in the form of a fine liquid mist by the spraying method have a grain diameter of 1.0 to 100 μm, preferably have a grain diameter of 10 to 80 μm.

The grain diameters in a portion contacting with the mold plane 12 of the die 10 are 1.0 to 100 μm and are preferably longer than the heights of the granules 20 to ensure adhesive strength.

When the diameter is less than 1.0 μm, a contact area is too small for the granules 20 to endure molding.

When the diameter is more than 100 μm, there is the risk of influencing a recesses-and-projections-like pattern such as a emboss shape.

This is because the recesses and projections of the recesses-and-projections-like pattern such as emboss are not completely filled up when the grain diameter is 1 to 50 μm.

The granules 20 have a height of 5 μm to 30 μm, preferably a height of 5 to 20 μm.

This is because, by lowering the heights of the granules 20 in comparison with a contact area, shear force applied to the granules 20 by the die 10 during molding can be reduced, peeling of the granules 20 can be inhibited, and a recesses-and-projections-like pattern such as a emboss shape is not completely filled up when the heights are 5 to 20 μm.

When the heights of granules 20 are high, a load due to the flow of a molding synthetic resin during injection-molding in which this die 10 is opened becomes large. In order to also make an excellent design and minimize the load during the molding, the heights of the granules 20 are preferably made to be 30 μm or less.

The spraying method is performed by spraying a solution, in which the composite material is mixed, at a spraying pressure ranging from 1 to 7 $kg/cm^2$ by a spray gun. A distance to a sprayed surface is about 5 to 40 cm.

The sprayed granular composite material is cured by heating the mold plane 12 of the die 10 at 150° C., followed by being maintained at 150° C. for 2 hours. The grains sprayed on the mold plane 12 were cured to add the granules 20 comprising the composite material to the mold plane 12. When this occurs, an organic solvent contained in the synthetic resin 22 constituting the composite material is volatilized to lower the heights of the granules 20.

In the granules 20, the ceramic powder 24 and the inorganic fiber 26 protrude from the external surface of the solidified synthetic resin 22 and constitute the gloss control projections 28 having fine, uneven surfaces with recesses and projections.

The solidified granules 20 are each independent structures, have appropriate spacings between the granules 20 adjacent to each other, and are scattered in spots and patches.

The granule 20 and the granule 20 which are adjacent to each other may be also connected by the contained inorganic fiber 26.

The sprayed granular granules 20 are preferably formed to occupy a rate of 40 to 80% of the mold area of the mold plane 12 of the die 10, more preferably 50 to 70% from the viewpoint of applying the granules 20 to the mold plane 12 in a uniform state.

When the rate of the occupied granules 20 is less than 40%, the effect of reduction in gloss (luster) (effect of reduction in gloss value (glossiness)) is low.

When the rate of the occupied granules 20 is more than 80%, the mold plane 12 of the die 10 is filled with the granules 20, so that the effect of reduction in gloss (luster) (effect of reduction in gloss value (glossiness)) cannot be expected.

The spacings between the independent granules 20 are 0.1 to 500 μm. There are portions where the spacings between the independent granules 20 are narrow and wide, compared with the grain diameters in the portion contacting with the mold plane 12 of die 10.

Not only the gloss control projections 28 comprising the granules 20, because of being granular, have no risk of peeling from the mold plane 12 of the die 10, but also a molded article which reflects the state of the basal surface (foundation surface) of the mold plane 12 of the exposed die 10 can be obtained.

Whereas the gradient of the basal surface (foundation surface) of the mold plane 12 of the die 10, such as the basal surface subjected to sandblast treatment, is slight, the surfaces of the gloss control projections 28 comprising the granules 20 have steep gradients. However, the heights of the gloss control projections 28 comprising the granules 20 are lower than the heights of the swells (surface irregularities) of the recesses-and-projections-like pattern on the basal surface (foundation surface) of the mold plane 12 of the die 10. Therefore, the recesses-and-projections-like pattern of the mold plane 12 of the die 10 has a larger effect during molding the external surface of the molded article than the recesses and projections of the gloss control projections 28 comprising the granules 20.

Although these granules 20 are formed on both core type and cavity type dies 10, the granules 20 may be also formed on only the mold plane 12 of the cavity type die 10 when great importance is attached to the design of a product surface.

A description is now made of the method for manufacturing the molding die 10.

The method for manufacturing the molding die 10 according to this invention includes the following steps:

(1) the recesses-and-projections-like pattern finishing step of performing finishing for forming a recesses-and-projections-like pattern on the molding die 10;

(2) the surface treatment step of performing the surface treatment of the mold plane 12 of the die 10 by a sandblast;

(3) the composite material mixing step of mixing a composite material comprising 50 to 80 parts by weight of the synthetic resin 22 constituting a shape retention fixation base material, 30 to 80 parts by weight of the ceramic powder 24 constituting a diffuse reflecting surface formation core material, 5 to 10 parts by weight of the inorganic fiber 26 constituting a roughness enhancement material, and 30 to 90 parts by weight of a solvent to stir the composite material;

(4) the spraying step of spraying the composite material in the form of a fine liquid mist on the mold plane 12 of the die 10 by compressed air by a spray gun; and (5) the adhesion step of heating-solidifying at 100 to 150° C. the composite material sprayed on the mold plane 12 of the die 10 to add the gloss control granules 20 having fine, uneven surfaces with recesses and projections at a coating rate of 40 to 80% on the mold plane 12.

The gloss control granules 20 constitute the gloss control projections 28 having fine, uneven surfaces with recesses and projections, having strength for enduring molding. In the gloss control projections 28, differently shaped bodies constituted by approximately bell-like bodies, approximately hanging bell-like bodies, approximately discal bodies, and approximately dice-like bodies as well as approximately hemispheroidal bodies, approximately oblate-hemispheroidal bodies, and approximately prolate-hemispheroidal bodies cut along planes crossing spherical surfaces having spherical, ellipsoidal, and cocoon shapes, and polyhedrons including truncated cubes, cuboctahedrons, and twisted cubes are formed with the shape retention fixation base material. Further, in the gloss control projections 28, fine projections protruding from the differently shaped bodies are formed with the roughness enhancement material and/or the diffuse reflecting surface formation core material.

The gloss control projections 28 have fine, uneven surfaces with recesses and projections, having strength for enduring molding, in which fine projections protruding from the differently shaped bodies are formed. In the gloss control projections 28, differently shaped bodies constituted by approximately bell-like bodies, approximately hanging bell-like bodies, approximately discal bodies, and approximately dice-like bodies as well as approximately hemispheroidal bodies, approximately oblate-hemispheroidal bodies, and approximately prolate-hemispheroidal bodies cut along planes crossing spherical surfaces having spherical, ellipsoidal, and cocoon shapes, and polyhedrons including truncated cubes, cuboctahedrons, and twisted cubes are formed with the shape retention fixation base material and fine projections protruding from the differently shaped bodies are formed with the roughness enhancement material and/or the diffuse reflecting surface formation core material.

The gloss control granules are each independently added at spacing to form gloss control projections on the mold plane of the die so that the surface of a molded product molded on the mold plane of the die adhered with the gloss control granules forms a surface with small specular reflection or diffuse reflection.

On the mold plane 12 of the die 10 formed by the method for manufacturing the die 10, the granules 20 are added so that the surface of a molded product molded on the mold plane 12 of the die 10 adhered with the gloss control granules 20 forms a surface with small specular reflection or diffuse reflection.

On the mold plane 12 of the die 10, the gloss control projections 28 constituted by the granules 20 and having fine, uneven surfaces with recesses and projections are formed at a coating rate of 40 to 80% on the mold plane 12.

In order to adhere such granules 20 to the surface of the mold plane 12 of the die 10 to form the gloss control projections 28 having surfaces with recesses and projections, first, a recesses-and-projections-like pattern is formed on the basal surface (foundation surface) of the mold plane 12 of the die 10. Finishing for forming a recesses-and-projections-like pattern, such as emboss finishing, is performed on the mold plane 12 to form the recesses-and-projections-like pattern.

Then, the emboss-finished mold plane 12 of the mold is degreased and cleaned.

After finishing for forming a recesses-and-projections-like pattern such as leather texture, geometric texture, or pear texture, surface treatment of the mold plane 12 of the die 10 is performed by a sandblast or the like.

For preventing the recesses-and-projections-like pattern of the grains finished on the mold plane from being damaged, the sandblast used preferably has a grit number of #80 to 220, desirably, more preferably #100 to 150 from the viewpoint of the effect of reduction in gloss (luster).

For preventing the recesses and projections of the grains finished on the mold plane, the glass bead preferably has a grit number of G#80 to 400, desirably, more preferably, G#80 to 200.

As a material to be projected, not only each of a sand and a glass bead may be projected as a simple substance but also they may be appropriately mixed and projected.

Remaining oxides on the mold surface of the mold plane 12 of the die 10 can be removed to control an applied surface by performing sandblast treatment.

The sandblast finishing is finishing for forming recesses and projections on the surface of a die base material by injecting a projection material from the nozzle of a sandblast device (not illustrated), spraying it on the surface of the die base material, and colliding the projection material with the surface of the die base material.

The sandblast device is a device which injects the projection material with a pressurization gas such as air or nitrogen from the nozzle, sprays it on the surface of the die base material put on a stage, and surface-finishes it.

The projection material is preferably a particle with a spherical shape, a polygon, or the like and edges, comprising a resin, glass, a metal, a ceramic, or the like, especially preferably a particle with edges. For example, mention is made of glass beads, zirconia particles, steel grids, alumina particles, silica particles, and the like.

In addition, the projection material preferably has a mean grain diameter of 1 to 1000 μm, more preferably 5 to 600 μm. Still further preferred is 60 to 80 μm.

The weight of one particle of the projection material is preferably 0.002 to 8 mg.

The die base material is preferably a resin, a ceramic, or a metal such as aluminum, copper, or steel.

The basis material of the die 10 may be also subjected to laser finishing or precision casting finishing for forming a recesses-and-projections-like pattern on the basal surface (foundation surface) of the mold plane 12 of the die 10.

The composite material comprising 50 to 80 parts by weight of the synthetic resin 22 constituting a shape retention fixation base material, 30 to 80 parts by weight of the ceramic powder 24 constituting a diffuse reflecting surface formation core material, 5 to 10 parts by weight of the inorganic fiber 26 constituting a roughness enhancement material, and 30 to 90 parts by weight of the solvent is mixed and stirred. Then, the stirred composite material is spray-coated on the sandblast-finished mold plane 12 of the die 10 by a spray gun so that the heights of the grains are 5 to 30 μm. Then, the die 10 is baked at 100 to 150° C. for 2 to 3 hours to solidify grains made by spraying the composite material.

When the composite material spouted from the spray gun is adhered to the mold plane 12, a solvent component is volatilized and the composite material becomes in the state of being extremely highly viscous. Therefore, the granular gloss control projections 28 can be formed on the mold plane 12 of the die 10 without dripping the composite material. The gloss control projections 28 constituted by the granules 20 have a viscosity decreased during increasing temperature in a heating-curing step and are spread out over the fine portions of the recesses and projections of the adhesive surface of the basal surface (foundation surface) of the mold plane 12 of the die 10.

In order to make the effect of the recesses and projections of the mold plane 12 larger than the recesses and projections of the granules 20, the granules 20 are constituted as follows.

Grain diameter: 1.0 to 100 μm, desirably 10 to 80 μm
Height: 5 to 30 μm, desirably 5 to 20 μm
Coating rate: 40 to 80%, desirably 50 to 70%

The granules 20 are further present on the surface of the mold plane 12 of the die 10, i.e., the recesses-and-projections-like pattern of the surface to be finished of the basal surface (foundation surface) and the exposed portion of the basal surface (foundation surface) of the mold plane 12 is present between the granule 20 and the granule 20, so that irregularities due to the recesses-and-projections-like pattern and granules 20 of the basal surface (foundation surface) of the mold plane 12 of the die 10 have a large influence on a gloss value (glossiness).

On the mold plane 12 of the die 10 molded in such a manner, the granules 20 are added so that the surface of a molded product molded on the mold plane 12 of the die 10 adhered with the granules 20 forms a surface with small specular reflection or diffuse reflection.

On the mold plane 12 of the die 10, the gloss control projections 28 having the fine, uneven surfaces with recesses and projections constituted by the granules 20 are formed at a coating rate of 40 to 80% on the mold plane 12.

Since the end of the inorganic fiber 26 particularly protrudes outward from the surface of the solidified synthetic resin 22, a more uneven surface with recesses and projections is formed.

A recesses-and-projections-like pattern such as a emboss pattern formed on the region other than the gloss control projections 28 having the fine, uneven surfaces with recesses and projections constituted by the granules 20 appears on the surface of the die 10.

(Molded Article and Manufacturing Method Therefor)

A method for manufacturing a molded article having a low luster with a synthetic resin material obtained by the known injection molding method using the die 10 according to an embodiment will be explained below.

Synthetic resin materials for molding a synthetic resin molded article include, for example, the following ones.

Thermoplastics include polyacetal resins, polyamide resins, polyethylene resins, polypropylene resins, fluorine resins, and the like, which are crystalline plastics.

In addition, the thermoplastics include ABS resins, AS resins, acrylic resins, polycarbonate resins, vinyl chloride resins, and the like, which are non-crystalline plastics.

Figure 5:
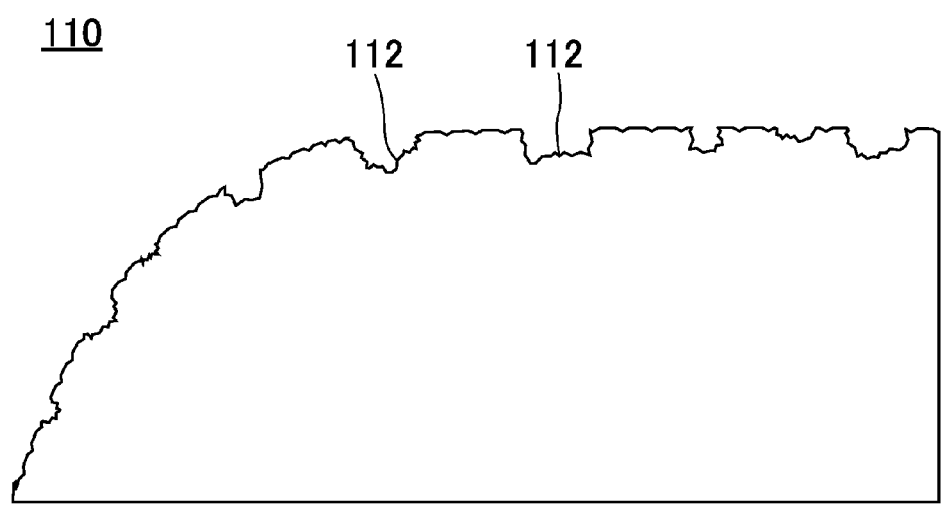
FIG. 5 is an enlarged cross-sectional view of a molded article molded by the die according to the present invention.
Figure 6:
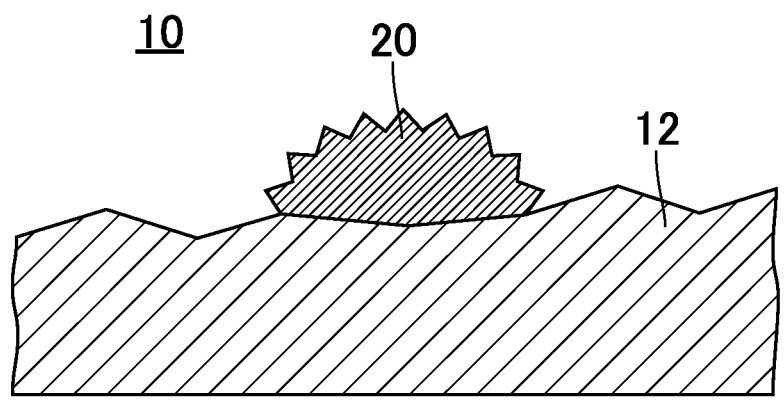
FIG. 6 is a cross-sectional view of the die according to the present invention or the molded article molded using the die, in which (A) is the view of the surface of the die; and (B) is the view of the surface of the molded article.
Figure 6:
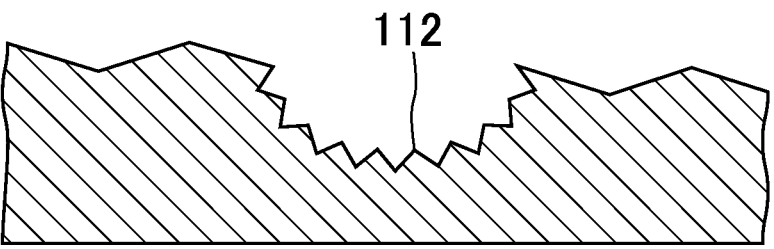

In the synthetic resin molded article 110 molded by the molding die 10 according to the present invention, a surface with small specular reflection is formed by forming the gloss control recesses 112 having fine, uneven surfaces with recesses and projections, in which the mold plane 12 of the die 10 is reversed, as illustrated in FIG. 5.

In the gloss control recesses 112, differently shaped recesses constituted by approximately bell-like, approximately hanging bell-like, approximately discal, and approximately dice-like ones as well as approximately hemispheroidal, approximately oblate-hemispheroidal, and approximately prolate-hemispheroidal ones cut along planes crossing spherical surfaces having spherical, ellipsoidal, and cocoon shapes, and polyhedron-like ones including truncated cube-like, cuboctahedron-like, and twisted cube-like ones are formed. In addition, in the gloss control recesses 112, fine recesses dented from surfaces of the differently shaped recesses are formed.

First, the die 10 used for molding a molded article with a synthetic resin material and a manufacturing method therefor will be explained.

When the mold plane 12 of the die 10 is subjected to sandblast treatment after finishing with a emboss such as a leather texture, a geometric texture, or a pear texture, generally, a uniform recesses-and-projections-like pattern is formed on the surface of the mold plane 12 of the die 10, and roughness also becomes uniform. In addition, it is estimated that a gloss (Gs)) (60° value is decreased by around 0.2, for example, when the sandblast treatment is performed using a projection material having a grit number of #100.

However, the gloss value of the molded article does not always become the estimated value when injection-molding with a synthetic resin material is performed using the die 10 subjected to the sandblast treatment. It is considered to be probably caused by, e.g., the poor flow of a synthetic resin material during molding using the die 10 even when the formation of a uniform recesses-and-projections-like pattern on the surface of the metal die 10 is visually appreciated.

This die 10 for reducing the gloss (gloss level) of the molded article according to the present invention and the manufacturing method therefor are suitable especially for use in a composite structure, in which composite members molded with different synthetic resins, such as interior components such as, for example, automotive consoles and door panels, and electronic device housings are adjacently linked to form one structure.

First, a method of harmonizing the gloss (gloss level) of a molded article with a targeted gloss (gloss level) is explained.

First, test plates (a: leather emboss die, b: geometric emboss die, and c: pear emboss die) subjected to grain-finishing with leather emboss, geometric emboss, and pear emboss are prepared, and each test plate is subjected to sandblast finishing with a projection material having the same grit number (e.g., #100 to 150) on the same conditions.

Then, the gloss values (glossiness of Gs (60°)) of the mold planes of the respective test plates (a: leather emboss die, b: geometric emboss die, and c) pear emboss die) with the leather emboss, the geometric emboss, and the pear emboss were measured according to JIS Z 8741 using a glossmeter (trade name: UNI GLOS S 60 GM-60) manufactured by Konica Minolta (die measurement step).

The gloss values (glossiness of Gs (60°)) of the respective test plates (a: leather emboss die, b: geometric emboss die, and c: pear emboss die) obtained in the die measurement step are used as reference data (die basic data acquisition step).

Then, test plates (a: leather emboss die, b: geometric emboss die, and c: pear emboss die) subjected to grain-finishing with leather emboss, geometric emboss, and pear emboss are prepared, and each test plate is subjected to sandblast finishing with a projection material having the same grit number (e.g., #100 to 150) on the same conditions.

Then, the test plates (d: leather emboss die, e: geometric emboss die, and f: pear emboss die) are spray-coated with a composite material comprising 50 to 80 parts by weight of the synthetic resin 22, 30 to 80 parts by weight of the ceramic powder 24, and 5 to 10 parts by weight of the inorganic fiber 26 so that the heights of grains made by being sprayed are 5 to 30 μm. Thereafter, the spray-coated die 10 is baked at 100 to 150° C. for 2 to 3 hours. The gloss control projections 28 made by curing the granules 20 comprising spray-coated composite material grains are each independently adhered to the surfaces of the test plates (d: leather emboss die, e: geometric emboss die, and f: pear emboss die) at spacings.

The gloss values (glossiness of Gs (60°)) of the mold planes 12 of the respective test plates described below were measured according to JIS Z 8741 using the glossmeter (trade name: UNI GLOSS 60 GM-60) manufactured by Konica Minolta at the coating rates of the granules 20 of 20%, 60%, and 95%, and the grain diameters and heights of the granules 20 which were as follows.

d-1: leather emboss, coating rate of 20%, grain diameter: 1.0 to 100 μm, height of 5 to 30 μm d-2: leather emboss, coating rate of 60%, grain diameter: 1.0 to 100 μm, height of 5 to 30 μm d-3: leather emboss, coating rate of 95%, grain diameter: 1.0 to 100 μm, height of 5 to 30 μm e-1: geometric emboss, coating rate of 20%, grain diameter: 1.0 to 100 μm, height of 5 to 30 μm e-2: geometric emboss, coating rate of 60%, grain diameter: 1.0 to 100 μm, height of 5 to 30 μm e-3: geometric emboss, coating rate of 95%, grain diameter: 1.0 to 100 μm, height of 5 to 30 μm f-1: pear emboss, coating rate of 20%, grain diameter: 1.0 to 100 μm, height of 5 to 30 μm f-2: pear emboss, coating rate of 60%, grain diameter: 1.0 to 100 μm, height of 5 to 30 μm f-3: pear emboss, coating rate of 95%, grain diameter: 1.0 to 100 μm, height of 5 to 30 μm The gloss values (glossiness of Gs (60°)) of the respective test plates of d-1 to 3, e-1 to 3, and f-1 to 3 are used as reference data (partially coated die basic data acquisition step).

Sequentially, injection-molding is performed with different synthetic resin materials such as polypropylene (PP) (X), an ABS resin (Y), and polystyrene (PS) (Z) using the test plates a, b, c, d-1 to 3, e-1 to 3, and f-1 to 3 on the basis of the same conditions.

Then, the molded articles of the various synthetic resins with the respective test plates were measured according to JIS Z 8741 using the glossmeter (trade name: UNI GLOSS 60 GM-60) manufactured by Konica Minolta. Then, based on the measurement results, the gloss values (glossiness of Gs (60°)) of the respective various molded articles are used as reference data (molded article basic data acquisition step).

Then, the die basic data of the gloss values (glossiness of Gs (60°)) of the test plates (a: leather emboss die, b: geometric emboss die, and c: pear emboss die) and the coated die basic data of the gloss values (glossiness of Gs (60°)) of the test plates (d: leather emboss die, e: geometric emboss die, and f: pear emboss die) are compared with the molded article basic data of the gloss values (Gs (60°)) of the molded articles. Then, it is confirmed whether or not the gloss values (glossiness of Gs (60°)) of the molded article are values close to gloss values (glossiness of Gs (60°))

estimated from the gloss values (glossiness of Gs (60°)) of the test plates (a: leather grain die, b: geometric grain die, c: pear grain die, d: leather grain die, e: geometric grain die, and f: pear grain die) (confirmation step).

In this example, there were some differences between the gloss values (glossiness of Gs (60°)) of the dies and the gloss values (glossiness of Gs (60°)) of the molded articles in the dies a, b, and c which were not adhered with the granules 20.

In contrast, in the dies d-1 to 3, e-1 to 3, and f-1 to 3, adhered with the granules 20, the gloss values (glossiness of Gs (60°)) of the molded articles and the gloss values (glossiness of Gs (60°)) of the dies were similar values or the gloss (luster) of the molded articles exhibited values close to those of the gloss (luster) of the dies.

It was revealed that, in the molded articles with the test plates (d-2, e-2, and f-2) at a coating rate of the granules 20 of 60%, all of the molded articles with the different synthetic resin materials (X), (Y), and (Z) had comparatively similar gloss values (Gs (60°)).

When there are the targeted gloss values (glossiness of Gs (60°)) of the molded articles at the coating rates of the granules 20 of around 60%, for example, when the gloss values (glossiness of Gs (60°)) at the coating rates of 50% and 70% are more targeted, the amount of the sprayed composite material is corrected so that the actual coating rates of the granules 20 adhering to the mold plane 12 of the die 10 are increased or decreased. Then, preferably, the spraying finishing of the composite material corresponding to the corrected amount of the composite material is performed to obtain the molded articles having the targeted gloss values (glossiness of Gs (60°)) (correction step).

In such a manner, the coating rates of the granules 20 adhered to the mold planes 12 of the plurality of dies 10 are corrected based on the targeted gloss values (glossiness of Gs (60°)) to harmonize the gloss values (glossiness of Gs (60°)) of the molded articles with the synthetic resin materials.

In the die 10 used for reducing the gloss (luster) value (glossiness) of a molded article molded with a synthetic resin material, the granules 20 comprising 50 to 80 parts by weight of the synthetic resin 22 which is a shape retention fixation base material, 30 to 80 parts by weight of the ceramic powder 24 which is a diffuse reflecting surface formation core material, and 5 to 10 parts by weight of the inorganic fiber 26 which is a roughness enhancement material are adhered to the mold plane 12 of the die 10 at spacings; and, on the mold plane 12 of the die 10, the granules 20 are added so that the surface of the molded product molded on the mold plane 12 of the die 10 adhered with the granules 20 is reduced and/or harmonized, and the gloss control projections 28 having fine, uneven surfaces with recesses and projections are formed at a coating rate of 40 to 80% on the mold plane 12.

The gloss control projections 28 have fine, uneven surfaces with recesses and projections, having strength for enduring molding, in which fine projections protruding from the differently shaped bodies are formed. In the gloss control projections 28, differently shaped bodies constituted by approximately bell-like bodies, approximately hanging bell-like bodies, approximately discal bodies, and approximately dice-like bodies as well as approximately hemispheroidal bodies, approximately oblate-hemispheroidal bodies, and approximately prolate-hemispheroidal bodies cut along planes crossing spherical surfaces having spherical, ellipsoidal, and cocoon shapes, and polyhedrons including truncated cubes, cuboctahedrons, and twisted cubes are formed with the shape retention fixation base material and fine projections protruding from the differently shaped bodies are formed with the roughness enhancement material and/or the diffuse reflecting surface formation core material.

The molding die 10 used in a method for reducing or harmonizing the gloss (glossiness) of a molded article molded with a synthetic resin material is formed by a manufacturing method including the following steps:

(1) the recesses-and-projections-like pattern finishing step of performing recesses-and-projections-like pattern finishing, such as emboss finishing, on the molding die 10;

(2) the surface treatment step of performing the surface treatment of the mold plane 12 of the die 10 by a sandblast or the like;

(3) the composite material mixing step of mixing a composite material comprising 50 to 80 parts by weight of the synthetic resin 22 which is a shape retention fixation base material, 30 to 80 parts by weight of the ceramic powder 24 which is a diffuse reflecting surface formation core material, 5 to 10 parts by weight of the inorganic fiber 26 which is a roughness enhancement material, and 30 to 90 parts by weight of the solvent to stir the composite material;

(4) the spraying step of spraying the composite material in the form of a fine liquid mist on the mold plane 12 of the die 10 by compressed air to have a coating rate of 40 to 80% on the mold plane so that, in order to match and/or harmonize a glossiness of a surface of a first molded product on which fine, uneven recesses and projections are molded with a glossiness of a surface of another second molded product to be compared, the glossiness(es) of either or both of the first molded product and the second molded product are reduced; and (5) the adhesion step of heating-solidifying at 100 to 150° C. the composite material sprayed on the mold plane 12 of the die 10 to add the granules 20 at a coating rate of 40 to 80% on the mold plane 10.

Then, the first molded product and the second molded product which are composite members for linking a plurality of molded products to form one structure are molded with a synthetic resin material by the molding die 10.

The gloss (luster) values (glossiness) of the first molded product and the second molded product are reduced and the gloss (luster) values (glossiness) are harmonized by the gloss control recesses 112 having fine, uneven surfaces with recesses and projections in which the gloss control projections 28 having the fine, uneven surfaces with recesses and projections of the mold plane 12 of the die 10 are reversed.

In the gloss control recesses 112, differently shaped recesses constituted by approximately bell-like, approximately hanging bell-like, approximately discal, and approximately dice-like ones as well as approximately hemispheroidal, approximately oblate-hemispheroidal, and approximately prolate-hemispheroidal ones cut along planes crossing spherical surfaces having spherical, ellipsoidal, and cocoon shapes, and polyhedron-like ones including truncated cube-like, cuboctahedron-like, and twisted cube-like ones are formed. In addition, in the gloss control recesses 112, fine recesses dented from surfaces of the differently shaped recesses are formed.

Thus, when light is incident on the surface of the synthetic resin molded article 110, the incident light is reflected by the fine surfaces with recesses and projections of the inner surfaces of the gloss control recesses 112 and becomes diffused light reflected in various directions. Since the incident light is reflected diffusely, reflected light reaching the eyes of an observer is reduced. Since a lot of the gloss control recesses 112 having fine surfaces with recesses and projections on inner surfaces as described above are formed on the surface of the molded article, the glossiness of the whole synthetic resin molded article 110 is reduced.

Since the surface of the molded article exhibits surface quality without luster, it is not necessary to further paint the molded article. Therefore, since painting is not required, the molded article formed by this die 10 does not contain any paint component or the like and is also easily recycled.

EXAMPLES OF DIE

A description is now made of Examples of the die according to the present invention.

Example 1

Example 1: The following composite material was sprayed on a die in which the mold plane of the injection-molding die with a synthetic resin (polypropylene) was subjected to leather emboss finishing, followed by sandblast finishing, at an air pressure of about 5 atm and a distance to a sprayed surface (mold plane) of about 10 to 30 cm (in most cases, about 20 cm) using a spray gun.
1. The sandblast finishing was performed on the following two conditions.
[Finish 1]
  (1) Die base material: S50C (X 200 mm×Y 100 mm×Z 10 mm)
  (2) Sandblast conditions
Projection material: alundum (grit number #150, mean grain diameter: 76 μm)
Distance between nozzle and die base material: 50 mm
Angle between nozzle and die base material: 8°
Compressed air pressure: 0.5 MPa
  (3) The surface was #400 polish-finished.
[Finish 2]
  (1) Die base material: S50C (X 200 mm×Y 100 mm×Z 10 mm)
  (2) Sandblast conditions
Projection material: alundum (in which grit number #150 and grit number G200 were mixed at a ratio of 2:1, mean grain diameter: 76 μm)
Distance between nozzle and die base material: 50 mm
Angle between nozzle and die base material: 8°
Compressed air pressure: 0.5 MPa
  (3) The surface was #400 polish-finished.
2. Composite material:
  Composite material in the state in which
    60 parts by weight of synthetic resin (epoxy resin, in liquid state or paste state with high viscosity),
    55 parts by weight of ceramic powder (alumina powder),
    9 parts by weight of inorganic fiber (silicon carbide fiber), and
    30 parts by weight of solvent (Cellosolve)
were stirred and mixed, diluted with a solvent, and dispersed or dissolved.

The composite materials of Examples 2 to 4 are as follows.

Example 2

Synthetic resin: 60 parts by weight of polyimide resin,
Ceramic powder: 55 parts by weight of alumina,
Inorganic fiber: 9 parts by weight of silicon carbide,
Solvent: 30 parts by weight of cyclohexanone

Example 3

Synthetic resin: 60 parts by weight of fluorine resin,
Ceramic powder: 55 parts by weight of zirconia,
Inorganic fiber: 9 parts by weight of carbon,
Solvent: 30 parts by weight of cyclohexanone

Example 4

Synthetic resin: 60 parts by weight of polyamide-imide resin,
Ceramic powder: 55 parts by weight of zirconia,
Inorganic fiber: 9 parts by weight of carbon,
Solvent: 30 parts by weight of cyclohexanone

Example 5

(1) Example 5: The following composite material was sprayed on a die in which the mold plane of the injection-molding die with a synthetic resin (polypropylene) was subjected to leather grain finishing, followed by sandblast finishing, at an air pressure of about 5 atm and a distance to a sprayed surface (mold plane) of about 10 to 30 cm (in most cases, about 20 cm) using a spray gun.
1. The conditions of the sandblast finishing were the same as those of Example 1.
2. Composite material:
  Composite material in the state in which
    70 parts by weight of synthetic resin (epoxy resin, in liquid state or paste state with high viscosity),
    65 parts by weight of ceramic powder (alumina powder),
    9 parts by weight of inorganic fiber (silicon carbide fiber), and
    65 parts by weight of solvent (Cellosolve) were stirred and mixed, diluted with a solvent, and dispersed or dissolved.

Example 6

Example 6: The following composite material was sprayed on a die in which the mold plane of the injection-molding die with a synthetic resin (polypropylene) was subjected to leather emboss finishing, followed by sandblast finishing, at an air pressure of about 5 atm and a distance to a sprayed surface (mold plane) of about 10 to 30 cm (in most cases, about 20 cm) using a spray gun.
1. Composite material:
  Composite material in the state in which
    57.5 parts by weight of synthetic resin (epoxy resin, in liquid state or paste state with high viscosity),
    42.5 parts by weight of ceramic powder (alumina powder),
    6.3 parts by weight of inorganic fiber (silicon carbide fiber), and
    45 parts by weight of solvent (Cellosolve)
were stirred and mixed, diluted with a solvent, and dispersed or dissolved.

Example 7

Example 7: The following composite material was sprayed on a die in which the mold plane of the injection-molding die with a synthetic resin (polypropylene) was subjected to leather emboss finishing, followed by sandblast finishing, at an air pressure of about 5 atm and a distance to a sprayed surface (mold plane) of about 10 to 30 cm (in most cases, about 20 cm) using a spray gun.
1. Composite material:
  Composite material in the state in which
    50 parts by weight of synthetic resin (epoxy resin, in liquid state or paste state with high viscosity), 80 parts by weight of ceramic powder (alumina powder),
10 parts by weight of inorganic fiber (silicon carbide fiber), and
90 parts by weight of solvent (Cellosolve)
were stirred and mixed, diluted with a solvent, and dispersed or dissolved.

Example 8

Example 8: The following composite material was sprayed on a die in which the mold plane of the injection-molding die with a synthetic resin (polypropylene) was subjected to leather emboss finishing, followed by sandblast finishing, at an air pressure of about 5 atm and a distance to a sprayed surface (mold plane) of about 10 to 30 cm (in most cases, about 20 cm) using a spray gun.
1. Composite material:
    Composite material in the state in which
    80 parts by weight of synthetic resin (epoxy resin, in liquid state or paste state with high viscosity),
    30 parts by weight of ceramic powder (alumina powder),
    5 parts by weight of inorganic fiber (silicon carbide fiber), and
    30 parts by weight of solvent (Cellosolve)
were stirred and mixed, diluted with a solvent, and dispersed or dissolved.

Example 9

Example 9: The following composite material was sprayed on a die in which the mold plane of the injection-molding die with a synthetic resin (polypropylene) was subjected to leather emboss finishing, followed by sandblast finishing, at an air pressure of about 5 atm and a distance to a sprayed surface (mold plane) of about 10 to 30 cm (in most cases, about 20 cm) using a spray gun.
1. Composite material:
    Composite material in the state in which
    72.5 parts by weight of synthetic resin (epoxy resin, in liquid state or paste state with high viscosity),
    67.5 parts by weight of ceramic powder (alumina powder),
    9 parts by weight of inorganic fiber (silicon carbide fiber), and
    75 parts by weight of solvent (Cellosolve)
were stirred and mixed, diluted with a solvent, and dispersed or dissolved.

Example 10

Example 10: The following composite material was sprayed on a die in which the mold plane of the injection-molding die with a synthetic resin (polypropylene) was subjected to leather emboss finishing, followed by sandblast finishing, at an air pressure of about 5 atm and a distance to a sprayed surface (mold plane) of about 10 to 30 cm (in most cases, about 20 cm) using a spray gun.
1. Composite material:
    Composite material in the state in which
    65 parts by weight of synthetic resin (epoxy resin, in liquid state or paste state with high viscosity),
    55 parts by weight of ceramic powder (alumina powder),
    5 parts by weight of inorganic fiber (silicon carbide fiber), and
    75 parts by weight of solvent (Cellosolve)
were stirred and mixed, diluted with a solvent, and dispersed or dissolved.

Example 11

Example 11: The following composite material was sprayed on a die in which the mold plane of the injection-molding die with a synthetic resin (polypropylene) was subjected to leather emboss finishing, followed by sandblast finishing, at an air pressure of about 5 atm and a distance to a sprayed surface (mold plane) of about 10 to 30 cm (in most cases, about 20 cm) using a spray gun.
1. Composite material:
    Composite material in the state in which
    75 parts by weight of synthetic resin (epoxy resin, in liquid state or paste state with high viscosity),
    65 parts by weight of ceramic powder (alumina powder),
    10 parts by weight of inorganic fiber (silicon carbide fiber), and
    85 parts by weight of solvent (Cellosolve)
were stirred and mixed, diluted with a solvent, and dispersed or dissolved.

Example 12

Example 12: The following composite material was sprayed on a die in which the mold plane of the injection-molding die with a synthetic resin (polypropylene) was subjected to leather emboss finishing, followed by sandblast finishing, at an air pressure of about 5 atm and a distance to a sprayed surface (mold plane) of about 10 to 30 cm (in most cases, about 20 cm) using a spray gun.
1. Composite material:
    Composite material in the state in which
    70 parts by weight of synthetic resin (epoxy resin, in liquid state or paste state with high viscosity),
    65 parts by weight of ceramic powder (alumina powder),
    9 parts by weight of inorganic fiber (silicon carbide fiber), and
    30 parts by weight of solvent (Cellosolve)
were stirred and mixed, diluted with a solvent, and dispersed or dissolved.

Example 13

Example 13: The following composite material was sprayed on a die in which the mold plane of the injection-molding die with a synthetic resin (polypropylene) was subjected to leather emboss finishing, followed by sandblast finishing, at an air pressure of about 5 atm and a distance to a sprayed surface (mold plane) of about 10 to 30 cm (in most cases, about 20 cm) using a spray gun.
1. Composite material:
    Composite material in the state in which
    70 parts by weight of synthetic resin (epoxy resin, in liquid state or paste state with high viscosity),
    65 parts by weight of ceramic powder (alumina powder),
    9 parts by weight of inorganic fiber (silicon carbide fiber), and
    80 parts by weight of solvent (Cellosolve)
were stirred and mixed, diluted with a solvent, and dispersed or dissolved.

Comparative Example 1

Comparative Example 1: The following composite material was sprayed on a die in which the mold plane of the injection-molding die with a synthetic resin (polypropylene) was subjected to leather emboss finishing, followed by sandblast finishing, at an air pressure of about 5 atm and a distance to a sprayed surface (mold plane) of about 10 to 30 cm (in most cases, about 20 cm) using a spray gun.

1. The conditions of the sandblast finishing were the same as those of Example 1.
2. Composite material:
    Composite material in the state in which
        synthetic resin: 60 parts by weight of epoxy resin,
        ceramic powder: 95 parts by weight of alumina,
        inorganic fiber: 15 parts by weight of silicon carbide, and
        solvent: 10 parts by weight of Cellosolve
    were stirred and mixed, diluted with a solvent, and dispersed or dissolved.

The composite materials of Comparative Examples 2 to 8 are as follows.

Comparative Example 2

Synthetic resin: 60 parts by weight of polyimide resin,
Ceramic powder: 95 parts by weight of alumina,
Inorganic fiber: 15 parts by weight of silicon carbide,
Solvent: 10 parts by weight of cyclohexanone Comparative Example 3

Synthetic resin: 60 parts by weight of fluorine resin,
Ceramic powder: 95 parts by weight of zirconia,
Inorganic fiber: 15 parts by weight of carbon,
Solvent: 10 parts by weight of cyclohexanone Comparative Example 4

Synthetic resin: 60 parts by weight of polyamide-imide resin,
Ceramic powder: 95 parts by weight of zirconia,
Inorganic fiber: 15 parts by weight of carbon,
Solvent: 10 parts by weight of cyclohexanone Comparative Example 5

Synthetic resin: 60 parts by weight of epoxy resin,
Ceramic powder: 20 parts by weight of alumina,
Inorganic fiber: 2 parts by weight of silicon carbide,
Solvent: 90 parts by weight of cyclohexanone Comparative Example 6

Synthetic resin: 60 parts by weight of polyimide resin,
Ceramic powder: 20 parts by weight of alumina,
Inorganic fiber: 2 parts by weight of silicon carbide,
Solvent: 90 parts by weight of cyclohexanone Comparative Example 7

Synthetic resin: 60 parts by weight of fluorine resin,
Ceramic powder: 20 parts by weight of zirconia,
Inorganic fiber: 2 parts by weight of carbon,
Solvent: 90 parts by weight of cyclohexanone Comparative Example 8

Synthetic resin: 60 parts by weight of polyamide-imide resin,
Ceramic powder: 20 parts by weight of zirconia,
Inorganic fiber: 2 parts by weight of carbon,
Solvent: 90 parts by weight of cyclohexanone Control of spray gun:
    Grain diameters of sprayed grains: 1.0 to 100 µm
    Position of spray gun during spraying: distance to mold plane 12 (sprayed surface) of 10 to 30 cm The grains sprayed by the spray gun and formed on a mold plane were solidified by the surface tension of a diluting solvent and were adhered to the basal surface (foundation surface) of the mold plane 12 of the die 10.

The grains sprayed by the spray gun and formed on the mold plane had the following shapes similar to those of the granules 20 and the gloss control projections 28.
    Grain diameter: 1.0 to 100 µm
    Height: 5 to 30 µm
Desirably, the grain diameter is 10 to 20 µm and the height is 10 to 20 µm.

(1) Evaluation of State of Adhesion of Grains (Granules 20) with Composite Material The state of the adhesion of the grains (granules 20) sprayed with the appropriately controlled spray gun so that the grain diameters of the grains (granules 20) with a sprayed composite material were up to around 100 µm was evaluated by visual observation. In each example, the granules 20 can be formed and uniformly sprayed.

In Comparative Examples 1 to 8, any granules 20 cannot be formed or uniformly sprayed.
    Blending ratio and spraying state of composite material
    Examples 1 to 9, and 12: good
    Examples 10, 11, and 13: very good
    Comparative Examples 1 to 4: poor
    Comparative Examples 5 to 8: poor
    "Very good" means that an adhesion state is very good.
    "Good" means that an adhesion state is good.
    "Poor" means that an adhesion state is poor.

A coating rate on the mold plane 12 with the grains (which formed the granules 20 and the gloss control projections 28) with the composite material sprayed on the mold plane 12 was 40 to 80%.

For the coating rate, the sprayed composite material was cured, followed by magnifying the mold plane 12 by 200 times and observing it to calculate the rate of the area of the gloss control projections 28 per unit area.

Then, the mold plane 12 of the die 10 was heated at 150° C. (temperature condition of heating) and thereafter maintained at 150° C. for 2 hours to cure the grains (which formed the granules 20 and the gloss control projections 28) with the composite material sprayed on the mold plane 12 and to adhere the granules 20 to the mold plane 12.

Temperature Conditions of Heating
(i) Composite material (shape retention fixation base material was epoxy resin) Examples 1, 5, 6, 7, 8, 9, 10, 11, 12, and 13, and Comparative Examples 1 and 5 150° C.
(ii) Composite material (shape retention fixation base material was fluorine resin) Example 3, and Comparative Examples 3 and 7 200° C.
(iii) Composite material (shape retention fixation base material was polyimide-imide resin) Example 4, and Comparative Examples 2, 4, 6, and 8 200° C.

The gloss control granules 20 constitute the gloss control projections 28 having fine, uneven surfaces with recesses and projections, having strength for enduring molding. In the gloss control projections 28, differently shaped bodies constituted by approximately bell-like bodies, approximately hanging bell-like bodies, approximately discal bodies, and approximately dice-like bodies as well as approximately hemispheroidal bodies, approximately oblate-hemispheroidal bodies, and approximately prolate-hemispheroidal bodies cut along planes crossing spherical surfaces having spherical, ellipsoidal, and cocoon shapes, and polyhedrons including truncated cubes, cuboctahedrons, and twisted cubes are formed with the shape retention fixation base material. Further, in the gloss control projections 28, fine projections protruding from the differently shaped bodies are formed with the roughness enhancement material and/or the diffuse reflecting surface formation core material.

The grains (which formed the granules 20 and the gloss control projections 28) adhered to the mold plane 12 as described above and a molded article molded using this die 10 were evaluated as follows.

(2) Evaluation of State of Adhesion of Grains (Forming Granules 20 and Gloss Control Projections 28) with Composite Material The state of the adhesion of the grains (gloss control projections 28) sprayed and cured with the appropriately controlled spray gun so that the grain diameters of the grains (gloss control projections 28) with a sprayed composite material were up to around 100 μm was evaluated by visual observation. In each example, the gloss control projections 28 can be formed and uniformly sprayed.

In Comparative Examples 1 to 8, any gloss control projections 28 cannot be formed or uniformly sprayed.

Blending ratio and spraying state of composite material
Examples 1 to 9, and 12: good
Examples 10, 11, and 13: very good
Comparative Examples 1 to 4: poor
Comparative Examples 5 to 8: poor
"Very good" means that an adhesion state is very good.
"Good" means that an adhesion state is good.
"Poor" means that an adhesion state is poor.

(3) The sprayed grains (which formed the granules 20 and the gloss control projections 28) with the composite material were cured, followed by measuring the diameters and heights of the formed gloss control projections 28. The measurement was performed with a surface roughness shape measuring machine Surfcom 130A (JIS1982) manufactured by Tokyo Seimitsu Co., Ltd.

Diameters and heights of gloss control projections 28
Example 1: 10 to 80 μm in diameter, 5 to 20 μm in height
Example 2: 10 to 80 μm in diameter, 5 to 20 μm in height
Example 3: 10 to 80 pin in diameter, 5 to 20 μm in height
Example 4: 10 to 80 μm in diameter, 5 to 20 μm in height
Example 5: 10 to 80 pin in diameter, 5 to 20 μm in height
Example 6: 10 to 80 μm in diameter, 5 to 20 μm in height
Example 7: 10 to 80 μm in diameter, 5 to 20 μm in height
Example 8: 10 to 80 μm in diameter, 5 to 20 μm in height
Example 9: 10 to 80 μm in diameter, 5 to 20 μm in height
Example 10: 10 to 80 μm in diameter, 5 to 20 μm in height
Example 11: 10 to 80 μm in diameter, 5 to 20 μm in height
Example 12: 10 to 80 μm in diameter, 5 to 20 μm in height
Example 13: 10 to 80 μm in diameter, 5 to 20 μm in height (4) Evaluation (1) of Gloss Value (Glossiness)

The gloss values (glossiness of Gs (60°)) of molded articles with polypropylene (PP) and ABS resin obtained by the known injection molding method using this die 10 were measured according to JIS Z 8741 using the glossmeter (trade name: UNI GLOSS 60 GM-60) manufactured by Konica Minolta. Gs (60°) means a specular gloss (level) at a measurement angle of 60 degrees.

The specular glossiness are measured by the following method in conformance with the measurement method specified in JIS Z8741-1997 "specular glossiness-measurement method". That is, a surface reflectivity is measured on the condition of an incidence angle of θ=60° using a specular glossiness measuring device in conformance with the above-described specification. Then, the percentage into which this measurement value is converted when the glossiness of a reference surface is 100 is expressed as a specular gloss level. It is specified that a specular reflectivity of 10% equivalent to a glossiness of 100 at an incidence angle of θ=60° using, as the reference surface, a black glass reference surface which was specified by the specification and of which the refraction index was a constant value of 1.567 in the whole visible wavelength range. The respective portions of a sample surface were measured at N=5 on the condition of an incidence angle of θ=60° using a specular glossiness measuring device, the glossmeter (trade name: UNI GLOSS 60 GM-60) manufactured by Konica Minolta, having the function of automatically performing the above-described conversion after the measurement and outputting a specular glossiness, and their mean value was regarded as the specular glossiness of the sample surface.

The results are listed in Table 1 (comparison of gloss (Gs (60°) values).

As a result, the gloss (Gs (60°) value was 1.3.

The gloss value (glossiness of Gs (60°)) of a molded article molded using the die 10 prior to performing this finishing was 1.8.

It was found that the gloss value (glossiness of Gs (60°)) of the molded article was decreased by about 0.5 without depending on the kind of a texture pattern by performing this finishing.

TABLE 1

| Type of Emboss patterns | | PP Molded Article | | ABS Molded Article | |
|---|---|---|---|---|---|
| | | Finish 1 | Finish 2 | Finish 1 | Finish 2 |
| Leather Texture Pattern | Prior to the Performance | 1.5 | 2.2 | 2.0 | 2.4 |
| | Example 1~13 | 1.3 | 1.6 | 1.5 | 1.6 |
| Geometric Texture Pattern | Prior to the Performance | 1.2 | 1.9 | 1.9 | 2.4 |
| | Example 1~13 | 1.0 | 1.3 | 1.4 | 1.5 |
| Pare Texture Pattern | Prior to the Performance | 1.2 | 1.8 | 1.7 | 1.9 |
| | Example 1~13 | 1.1 | 1.4 | 1.2 | 1.2 |

(5) Evaluation (2) of Gloss Value (Glossiness)

The composite materials of Examples 1 to 5 were sprayed on the mold planes 12 (test plates of S50C) of dies 10 having 100 mm long and 150 mm wide sizes by a spray gun to form gloss control projections 28.

An air pressure is about 5 atm. A distance between the spray gun and the finished surface (mold plane 12) is about 10 to 30 cm (in most cases, 20 cm).

A coating rate was varied in a stepwise fashion by controlling the spray gun so that the maximum grain diameters of the synthetic resins of the sprayed composite materials were approximately about 100 μm. The gloss values (glossiness of Gs (60°)) of molded articles molded using the test plates prior to the performance and molded articles molded after the performance were measured to calculate the variations of the gloss (Gs)(60°) values.

The gloss values (glossiness of Gs (60°)) were measured according to JIS Z 8741 using the glossmeter (trade name: UNI GLOSS 60 GM-60) manufactured by Konica Minolta.

The molding was performed the already available injection molding method, and the molding resin was a PP resin.

The results are listed in Table 2 (variations of gloss values (glossiness of Gs)(60°) before and after performance).

The reduction effect of the reduction effect (gloss value (gloss level)) of the gloss (luster-) was significant when the coating rate was 40 to 80%. Recesses and projections on a die plane become fewer when the coating rate is low, while the ceramic powder and inorganic fiber which are blended are buried in a synthetic resin to inhibit reduction in gloss (luster) (reduction in gloss level) when the coating rate is high.

TABLE 2

| | Coating Rates | | | | |
|---|---|---|---|---|---|
| | 30% | 40% | 80% | 90% | 95% |
| ΔGs (60°) | −0.2 | −1.0 | −1.0 | −0.5 | −0.2 |

(6) Evaluation of Strength (1)

To examine the adhesive strengths of the formed and sprayed grains (which formed the granules 20 and the gloss control projections 28) with the composite materials, polypropylene (PP) resins were 100-shot-molded by the already available injection molding method, and the presence or absence of peeling of the gloss control projections 28 comprising the formed grains was observed. The peeling of the gloss control projections 28 was seen in each case.

The results are listed in Table 3 (size of the gloss control projections 28 formed with each composite material (Examples 1 to 4)).

TABLE 3

| | Size of Projection | | Coating | Result of the presence |
|---|---|---|---|---|
| | Diameters (μm) | Heights (μm) | Rates (%) | of peeling of projection after 100-shot-molded |
| Example 1 | 1.0~50 | 5~20 | 60 | ○ |
| Example 2 | 1.0~70 | 5~30 | 80 | ○ |
| Example 3 | 10~100 | 5~30 | 90 | ○ |
| Example 4 | 10~100 | 5~30 | 50 | ○ |

The sizes and coating rates of the gloss control projections 28 formed with the composite materials according to Examples 1 to 5 were varied in a stepwise fashion to 10000-shot-mold PP resins by the already available injection molding method, and the presence or absence of peeling of the formed gloss control projections 28 was observed. The results are listed in Table 4 (adhesive strength by size and coating rate of formed gloss control projections 28). It was found that the formed gloss control projections 28 were easily peeled when having a certain size or larger.

TABLE 4

| | Coating Rates | | |
|---|---|---|---|
| Size of Projection | 30% | 60% | 95% |
| Diameters: 1~50 μm Heights: 5~20 μm | ○ | ○ | ○ |
| Diameters: 110~150 μm Heights: 40~50 μm | × | × | × |

(7) Evaluation of Durability

To confirm how long the effect of reduction in gloss by this finishing continued, the variations of gloss (Gs (60°)) values by the number of molding shots were examined.

For measuring the gloss, the measurement was performed according to JIS Z 8741 using the glossmeter (trade name: UNI GLOSS 60 GM-60) manufactured by Konica Minolta to examine the variations of the gloss values (glossiness of Gs (60°)).

The known injection molding was performed using the dies 10 of Examples 1 to 5, and the gloss values (glossiness of Gs (60°)) of molded articles prior to a performed operation and molded articles at about 10000, about 20000, about 30000, about 40000, and about 50000 shots were measured according to JIS Z 8741 using the glossmeter (trade name: UNI GLOSS 60 GM-60) manufactured by Konica Minolta.

The molding material is polypropylene (PP).

The measurement results are listed in Table 5.

The gloss value (glossiness) was 1.8 prior to the performed operation, while the gloss value (glossiness) became 1.3 when this finishing was performed.

Even after molding at about 50000 shots, the gloss value was the same as that after about 10000 shots.

In conventionally etching pear or delustering treatment by a sandblast, the glossiness of the molded article was increased and it was necessary to perform delustering finishing again when molding at several tens of thousands of shots was performed; however, in the case of the die 10 according to the present invention, it was found that re-finishing was not needed.

TABLE 5

| | Gross Value (Gs (60°)) |
|---|---|
| Prior to a performed operation | 1.8 |
| About 10,000 Shots | 1.3 |
| About 20,000 Shots | 1.3 |
| About 30,000 Shots | 1.3 |
| About 40,000 Shots | 1.3 |
| About 50,000 Shots | 1.3 |

(Examples of Molded Article)

A description is now made of Examples for manufacturing a molded article, of which the luster and gloss (glossiness) are reduced and/or controlled, using the molding die.

Example 14

The gloss value (glossiness of Gs (60°)) of 1.3 measured according to JIS Z 8741 is regarded as a reference value for the gloss values (glossiness of Gs (60°)) of a first molded product and a second molded product which are adjacently linked composite members.

The die for molding the first molded product is regarded as a composite member example 1, and the die for molding the second molded product is regarded as a composite member example 2.

Composite Member Example 1

The following composite materials (composite materials of Example 1 and 5 to 13) were sprayed on dies in which the mold planes of the injection molding dies with a synthetic resin (polypropylene) were subjected to finishing with leather texture, geometric texture, and pear texture utilizing known etching finishing, followed by sandblast finishing, using a spray gun at an air pressure of about 5 atm at distances to the sprayed surfaces (mold planes) of about 10 to 30 cm (in most cases, about 20 cm).

Composite material (composite material of Example 1):
Composite material in the state in which
60 parts by weight of synthetic resin (epoxy resin, in liquid state or paste state with high viscosity),
55 parts by weight of ceramic powder (alumina powder),
9 parts by weight of inorganic fiber (silicon carbide fiber), and
30 parts by weight of solvent (Cellosolve)
were stirred and mixed, diluted with a solvent, and dispersed or dissolved.

For spraying the composite materials of Examples 1 and 5 to 13 by the spray gun, finishing for adhering the granules was performed so that the gloss control projections 28 having diameters of 1 to 50 μm and heights of 5 to 20 μm were at coating rates of 20% and 60%.

Then, the mold plane 12 of the die 10 was heated at 150° C. and thereafter maintained at 150° C. for 2 hours to cure the grains (which formed the granules 20 and the gloss control projections 28) with the composite material sprayed on the mold plane 12 and to adhere the granules 20 to the mold plane 12.

Composite member example 2: The following composite materials (composite materials of Example 1 and 5 to 13) were sprayed on dies in which the mold planes of the injection molding dies with a synthetic resin (ABS resin) were subjected to finishing with leather emboss, geometric emboss, and pear emboss utilizing known etching finishing, followed by sandblast finishing, using a spray gun at an air pressure of about 5 atm at distances to the sprayed surfaces (mold planes) of about 10 to 30 cm (in most cases, about 20 cm).

Composite material (composite material of Example 1):
Composite material in the state in which
60 parts by weight of synthetic resin (epoxy resin, in liquid state or paste state with high viscosity),
55 parts by weight of ceramic powder (alumina powder),
9 parts by weight of inorganic fiber (silicon carbide fiber), and
30 parts by weight of solvent (Cellosolve)
were stirred and mixed, diluted with a solvent, and dispersed or dissolved.

For spraying the composite materials of Examples 1 and 5 to 13 by the spray gun, finishing for adhering the granules was performed so that the gloss control projections 28 having diameters of 1 to 50 μm and heights of 5 to 20 μm were at coating rates of 20% and 60%.

Then, the mold plane 12 of the die 10 was heated at 150° C. and thereafter maintained at 150° C. for 2 hours to cure the grains (which formed the granules 20 and the gloss control projections 28) with the composite material sprayed on the mold plane 12 and to adhere the granules 20 to the mold plane 12.

The gloss values (glossiness of Gs (60°)) of the respective molded articles with PP and ABS obtained by the known injection molding method from the respective dies 10 were measured at two places. The gloss values (glossiness of Gs (60°)) were measured according to JIS Z 8741 using the glossmeter (trade name: UNI GLOSS 60 GM-60) manufactured by Konica Minolta.

Each measurement result is listed in Table 6-1 (comparison of glossiness of gloss values (Gs (60°))). The gloss values (glossiness of Gs (60°)) of the molded articles prior to the performance were reduced by approximately about 0.5 to 1.0 by performing this finishing, without depending on the gloss values (glossiness of Gs (60°)) prior to the performance.

TABLE 6-1

| Type of Emboss patterns | | PP Molded Article | | ABS Molded Article | |
|---|---|---|---|---|---|
| Leather Texture Pattern | Prior to the Performance | 1.8 | 2.0 | 2.0 | 2.4 |
| | Example 14 (1.5~13) | 1.2 | 1.3 | 1.3 | 1.3 |
| Geometric Texture Pattern | Prior to the Performance | 1.4 | 2.0 | 2.0 | 2.3 |
| | Example 14 (1.5~13) | 1.0 | 1.2 | 1.2 | 1.3 |
| Pare Texture Pattern | Prior to the Performance | 1.4 | 1.8 | 1.8 | 2.2 |
| | Example 14 (1.5~13) | 1.0 | 1.2 | 1.2 | 1.3 |

Example 15

The gloss value (glossiness of Gs (60°)) of 1.3 measured according to JIS Z 8741 is regarded as a reference value for the gloss values (glossiness of Gs (60°)) of a first molded product and a second molded product which are adjacently linked composite members.

The die for molding the first molded product is regarded as a composite member example 3, and the die for molding the second molded product is regarded as a composite member example 4.

Composite Member Example 3

The following composite materials (composite materials of Example 1 and 5 to 13) were sprayed on dies in which the mold planes of the injection molding dies with a synthetic resin (polypropylene) were subjected to finishing with leather texture, geometric texture, and pear texture utilizing known etching finishing, followed by sandblast finishing, using a spray gun at an air pressure of about 5 atm at distances to the sprayed surfaces (mold planes) of about 10 to 30 cm (in most cases, about 20 cm).

Composite material (composite material of Example 1):
Composite material in the state in which
60 parts by weight of synthetic resin (epoxy resin, in liquid state or paste state with high viscosity),
55 parts by weight of ceramic powder (alumina powder),
9 parts by weight of inorganic fiber (silicon carbide fiber), and
30 parts by weight of solvent (Cellosolve)
were stirred and mixed, diluted with a solvent, and dispersed or dissolved.

For spraying the composite materials of Examples 1 and 5 to 13 by the spray gun, finishing for adhering the granules was performed so that the gloss control projections 28 having diameters of 1 to 50 μm and heights of 5 to 20 μm were at coating rates of 20% and 60%.

Then, the mold plane 12 of the die 10 was heated at 150° C. and thereafter maintained at 150° C. for 2 hours to cure the grains (which formed the granules 20 and the gloss control projections 28) with the composite material sprayed on the mold plane 12 and to adhere the granules 20 to the mold plane 12.

Composite Member Example 4

The following composite materials (composite materials of Example 1 and 5 to 13) were sprayed on dies in which the mold planes of the injection molding dies with a synthetic resin (polystyrene (PS)) were subjected to finishing with leather texture, geometric texture, and pear texture utilizing known etching finishing, followed by sandblast finishing, using a spray gun at an air pressure of about 5 atm at distances to the sprayed surfaces (mold planes) of about 10 to 30 cm (in most cases, about 20 cm).

Composite material (composite material of Example 1):
Composite material in the state in which
60 parts by weight of synthetic resin (epoxy resin, in liquid state or paste state with high viscosity),
55 parts by weight of ceramic powder (alumina powder),
9 parts by weight of inorganic fiber (silicon carbide fiber), and
30 parts by weight of solvent (Cellosolve)
were stirred and mixed, diluted with a solvent, and dispersed or dissolved.

For spraying the composite materials of Examples 1 and 5 to 13 by the spray gun, finishing for adhering the granules was performed so that the gloss control projections 28 having diameters of 1 to 50 μm and heights of 5 to 20 μm were at coating rates of 20% and 60%.

Then, the mold plane 12 of the die 10 was heated at 150° C. and thereafter maintained at 150° C. for 2 hours to cure the grains (which formed the granules 20 and the gloss control projections 28) with the composite material sprayed on the mold plane 12 and to adhere the granules 20 to the mold plane 12.

The gloss values (glossiness of Gs (60°)) of the respective molded articles with PP and PS obtained by the known injection molding method from the respective dies 10 were measured at two places. The gloss values (glossiness of Gs (60°)) were measured according to JIS Z 8741 using the glossmeter (trade name: UNI GLOSS 60 GM-60) manufactured by Konica Minolta.

Each measurement result is listed in Table 6-2 (comparison of glossiness of gloss values (Gs (60°))). The gloss values (glossiness of Gs (60°)) of the molded articles prior to the performance were reduced by approximately about 0.5 to 1.0 by performing this finishing, without depending on the gloss values (glossiness of Gs (60°)) prior to the performance.

TABLE 6-1

| Type of Emboss patterns | | PP Molded Article | | PS Molded Article | |
|---|---|---|---|---|---|
| Leather Texture Pattern | Prior to the Performance | 1.8 | 1.9 | 2.3 | 2.4 |
| | Example 15 (1.5~13) | 1.2 | 1.2 | 1.3 | 1.3 |
| Geometric Texture Pattern | Prior to the Performance | 1.4 | 1.5 | 2.2 | 2.3 |
| | Example 15 (1.5~13) | 1.0 | 1.0 | 1.2 | 1.3 |
| Pare Texture Pattern | Prior to the Performance | 1.4 | 1.3 | 2.3 | 2.2 |
| | Example 15 (1.5~13) | 1.0 | 1.0 | 1.2 | 1.3 |

(Method for Matching Glossiness)

A description is now made of a method for matching the glosses (glossiness) of two or more molded articles molded with different synthetic resin materials, molded articles molded with different synthetic resin materials, a die 10 used for matching glosses (glossiness), and a manufacturing method therefor.

When the mold plane 12 of the die 10 is subjected to sandblast treatment after finishing for forming a recesses-and-projections-like pattern, such as finishing with a emboss such as a leather emboss, a geometric emboss, or a pear emboss, generally, a uniform recesses-and-projections-like pattern is formed on the surface of the mold plane 12 of the die 10, and roughness also becomes uniform. In addition, it is estimated that a gloss (Gs (60°)) value is decreased by around 0.2, for example, when the sandblast treatment is performed using a projection material having a grit number of #100.

However, the gloss value of the molded article does not always become the estimated value when injection-molding with a synthetic resin material is performed using the die 10 subjected to the sandblast treatment. It is considered to be probably caused by, e.g., the poor flow of a synthetic resin material during molding using the die 10 even when the formation of a uniform recesses-and-projections-like pattern on the surface of the metal die 10 is visually appreciated.

For example, since an automotive interior component is composed of combined molded articles with a large number of synthetic resin materials, it is desired to obtain a unified visual appreciation even when the molded articles with the different synthetic resin materials are combined. In addition, a die for molding a molded article with a synthetic resin material, which die is ready for it, is also desired.

The method for matching the glosses (glossiness) of the molded articles according to the present invention, this die 10, and the manufacturing method therefor are suitable especially for use in a composite structure, in which composite members molded with different synthetic resins, such as interior components such as, for example, automotive consoles and door panels, and electronic device housings are adjacently linked to form one structure.

First, the method for matching the glosses (glossiness) of molded articles is explained.

First, test plates (a: leather texture die, b: geometric texture die, and c: pear texture die) subjected to texture-finishing with leather texture, geometric texture, and pear texture are prepared, and each test plate is subjected to sandblast finishing with a projection material having the same grit number (e.g., #100 to 150) on the same conditions.

Then, the gloss values (glossiness of Gs (60°)) of the mold planes of the respective test plates (a: leather texture die, b: geometric texture die, and c) pear texture die) with the leather texture, the geometric texture, and the pear texture were measured according to JIS Z 8741 using a glossmeter (trade name: UNI GLOSS 60 GM-60) manufactured by Konica Minolta (die measurement step).

The gloss values (glossiness of Gs (60°)) of the respective test plates (a: leather emboss die, b: geometric emboss die, and c: pear emboss die) obtained in the die measurement step are used as reference data (die basic data acquisition step).

Then, test plates (a: leather emboss die, b: geometric emboss die, and c: pear emboss die) subjected to grain-finishing with leather emboss, geometric emboss, and pear emboss are prepared, and each test plate is subjected to sandblast finishing with a projection material having the same grit number (e.g., #100 to 150) on the same conditions.

Then, the test plates (d: leather emboss die, e: geometric emboss die, and f: pear emboss die) are spray-coated with a composite material comprising 50 to 80 parts by weight of the synthetic resin 22, 30 to 80 parts by weight of the ceramic powder 24, and 5 to 10 parts by weight of the inorganic fiber 26 so that the heights of grains made by being sprayed are 5 to 30 μm. Thereafter, the spray-coated die 10 is baked at 100 to 150° C. for 2 to 3 hours. The gloss control projections 28 made by curing the granules 20 comprising spray-coated composite material grains are each independently adhered to the surfaces of the test plates (d: leather emboss die, e: geometric emboss die, and f: pear emboss die) at spacings.

The gloss values (glossiness of Gs (60°)) of the mold planes 12 of the respective test plates described below were measured according to JIS Z 8741 using the glossmeter (trade name: UNI GLOSS 60 GM-60) manufactured by Konica Minolta at the coating rates of the granules 20 of 20%, 60%, and 95%, and the grain diameters and heights of the granules 20 which were as follows.

d-1: leather emboss, coating rate of 20%, grain diameter: 1.0 to 100 µm, height of 5 to 30 µm d-2: leather emboss, coating rate of 60%, grain diameter: 1.0 to 100 µm, height of 5 to 30 µm d-3: leather emboss, coating rate of 95%, grain diameter: 1.0 to 100 µm, height of 5 to 30 µm e-1: geometric emboss, coating rate of 20%, grain diameter: 1.0 to 100 µm, height of 5 to 30 µm e-2: geometric emboss, coating rate of 60%, grain diameter: 1.0 to 100 µm, height of 5 to 30 µm e-3: geometric emboss, coating rate of 95%, grain diameter: 1.0 to 100 µm, height of 5 to 30 µm f-1: pear emboss, coating rate of 20%, grain diameter: 1.0 to 100 µm, height of 5 to 30 µm f-2: pear emboss, coating rate of 60%, grain diameter: 1.0 to 100 µm, height of 5 to 30 µm f-3: pear emboss, coating rate of 95%, grain diameter: 1.0 to 100 µm, height of 5 to 30 µm The gloss values (glossiness of Gs (60°)) of the respective test plates of d-1 to 3, e-1 to 3, and f-1 to 3 are used as reference data (partially coated die basic data acquisition step).

Sequentially, injection-molding is performed with different synthetic resin materials such as polypropylene (PP) (X), an ABS resin (Y), and polystyrene (PS) (Z) using the test plates a, b, c, d-1 to 3, e-1 to 3, and f-1 to 3 on the basis of the same conditions.

Then, the molded articles of the various synthetic resins with the respective test plates were measured according to JIS Z 8741 using the glossmeter (trade name: UNI GLOSS 60 GM-60) manufactured by Konica Minolta. Then, based on the measurement results, the gloss values (glossiness of Gs (60°)) of the respective various molded articles are used as reference data (molded article basic data acquisition step).

Then, the die basic data of the gloss values (glossiness of Gs (60°)) of the test plates (a: leather emboss die, b: geometric emboss die, and c: pear emboss die) and the coated die basic data of the gloss values (glossiness of Gs (60°)) of the test plates (d: leather emboss die, e: geometric emboss die, and f: pear emboss die) are compared with the molded article basic data of the gloss values (Gs (60°)) of the molded articles. Then, it is confirmed whether or not the gloss values (glossiness of Gs (60°)) of the molded article are values close to gloss values (glossiness of Gs (60°)) estimated from the gloss values (glossiness of Gs (60°)) of the test plates (a: leather emboss die, b: geometric emboss die, c: pear emboss die, d: leather emboss die, e: geometric emboss die, and f: pear emboss die) (confirmation step).

In this example, there were some differences between the gloss values (glossiness of Gs (60°)) of the dies and the gloss values (glossiness of Gs (60°)) of the molded articles in the dies a, b, and c which were not adhered with the granules 20.

In contrast, in the dies d-1 to 3, e-1 to 3, and f-1 to 3, adhered with the granules 20, the gloss values (glossiness of Gs (60°)) of the molded articles and the gloss values (glossiness of Gs (60°)) of the dies were similar values or the gloss (luster) of the molded articles exhibited values close to those of the gloss (luster) of the dies.

It was revealed that, in the molded articles with the test plates (d-2, e-2, and f-2) at a coating rate of the granules 20 of 60%, all of the molded articles with the different synthetic resin materials (X), (Y), and (Z) had comparatively similar gloss values (Gs (60°)).

Furthermore, when the molded articles with the different synthetic resin materials (X), (Y), and (Z) were adjacently combined to investigate a matching degree by visual appreciation, it was revealed to present comparatively similar lusters.

When there are the targeted gloss values (glossiness of Gs (60°)) of the molded articles at the coating rates of the granules 20 of around 60%, for example, when the gloss values (glossiness of Gs (60°)) at the coating rates of 50% and 70% are more targeted, the amount of the sprayed composite material is corrected so that the actual coating rates of the granules 20 adhering to the mold plane 12 of the die 10 are increased or decreased. Then, preferably, the spraying finishing of the composite material corresponding to the corrected amount of the composite material is performed to obtain the molded articles having the targeted gloss values (glossiness of Gs (60°)) (correction step).

In order to match the gloss values (glossiness of Gs (60°)) of molded articles molded by different two or more dies 10 for molding with different synthetic resin materials to targeted gloss values (glossiness of Gs (60°)), the coating rate(s) of the granules 20 on the mold plane(s) 12 of the two dies 10 or either of the dies 10 were preferably corrected to make them closer to the targeted gloss values (glossiness of Gs (60°)) (correction step).

In such a manner, the coating rates of the granules 20 adhered to the mold planes 12 of the plurality of dies 10 are corrected based on the targeted gloss values (glossiness of Gs (60°)) to match or harmonize the gloss values (glossiness of Gs (60°)) of the molded articles with the different synthetic resin materials.

In the die 10 used for matching gloss (luster) values (glossiness) to molded articles molded with different synthetic resin materials, the granules 20 comprising 50 to 80 parts by weight of the synthetic resin 22 which is a shape retention fixation base material, 30 to 80 parts by weight of the ceramic powder 24 which is a diffuse reflecting surface formation core material, and 5 to 10 parts by weight of the inorganic fiber 26 which is a roughness enhancement material are adhered to the mold plane 12 of the die 10 at spacings; and, on the mold plane 12 of the die 10, the granules 20 are added so that the glossiness of the surface of the molded product molded on the mold plane 12 of the die 10 adhered with the granules 20 is matched and/or harmonized with that of the surface of another molded product, and the gloss control projections 28 having fine, uneven surfaces with recesses and projections are formed at a coating rate of 40 to 80% on the mold plane 12.

The gloss control projections 28 have fine, uneven surfaces with recesses and projections, having strength for enduring molding. In the gloss control projections 28, differently shaped bodies constituted by approximately bell-like bodies, approximately hanging bell-like bodies, approximately discal bodies, and approximately dice-like bodies as well as approximately hemispheroidal bodies, approximately oblate-hemispheroidal bodies, and approximately prolate-hemispheroidal bodies cut along planes crossing spherical surfaces having spherical, ellipsoidal, and cocoon shapes, and polyhedrons including truncated cubes, cuboctahedrons, and twisted cubes are formed with the shape retention fixation base material and fine projections protruding from the differently shaped bodies are formed with the roughness enhancement material and/or the diffuse reflecting surface formation core material.

The molding die 10 used in a method for matching or harmonizing a gloss (glossiness) with that of a molded article molded with a different material is formed by a manufacturing method including the following steps:

(1) the recesses-and-projections-like pattern finishing step of forming a recesses-and-projections-like pattern, such as emboss finishing, on the molding die 10;

(2) the surface treatment step of performing the surface treatment of the mold plane 12 of the die 10 by a sandblast or the like;

(3) the composite material mixing step of mixing a composite material comprising 50 to 80 parts by weight of the synthetic resin 22 which is a shape retention fixation base material, 30 to 80 parts by weight of the ceramic powder 24 which is a diffuse reflecting surface formation core material, 5 to 10 parts by weight of the inorganic fiber 26 which is a roughness enhancement material, and 30 to 90 parts by weight of the solvent to stir the composite material;

(4) the spraying step of spraying the composite material in the form of a fine liquid mist on the mold plane 12 of the die 10 by compressed air to have a coating rate of 40 to 80% on the mold plane so that, in order to match and/or harmonize a glossiness of a surface of a first molded product on which fine, uneven recesses and projections are molded with a glossiness of a surface of another second molded product to be compared, the glossiness(es) of either or both of the first molded product and the second molded product are reduced; and (5) the adhesion step of heating-solidifying at 100 to 150° C. the composite material sprayed on the mold plane 12 of the die 10 to add the granules 20 at a coating rate of 40 to 80% on the mold plane 10.

Then, the mold planes 12 of the above-described two or the plurality of dies 10 for molding the first molded product and the second molded product, which is a composite member, molded with different synthetic resin materials for adjacently forming one structure, are constituted so that the glossiness of the surfaces of the first molded product and the second molded product are matched or harmonized.

Specifically, they are constituted so that the glossiness of the surface of the first molded product molded on the mold plane 12 of the die 10 adhered with the granules 20 is matched or harmonized with that of the surface of the second molded product (which is a composite member) molded with the different synthetic resin materials for forming one structure adjacently with the first molded product.

In the mold planes 12 of the above-described two or the plurality of the dies 10, the granules 20 are added at a coating rate of 40 to 80% on the mold plane 12 to form the gloss control projections 28 having the fine, uneven surfaces with recesses and projections comprising the granules 20 at a coating rate of 40 to 80% on the mold plane 12. Then, the gloss (glossiness) of the first molded product formed by the mold planes 12 of the above-described two or the plurality of the dies 10 is matched or harmonized with the gloss (glossiness) of the second molded product.

For example, the mold plane 12 of the first die 10 for molding the first molded product constitutes the mold plane 12 of the die 10 for molding the first molded product molded with the thermoplastic non-crystalline or crystalline resin different from the synthetic resin material constituting the second molded product. The mold plane 12 of the first die 10 is constituted by the mold plane 12 of the die 10 adhered with the granules 20 to match and/or harmonize with the gloss level of the surface of the second molded product molded with a thermoplastic crystalline or non-crystalline resin.

Then, the first molded product is molded by the first molding die 10. The first molded product is a composite member for adjacently linking to the second molded product to form one structure with a synthetic resin material different from the synthetic resin material which constitutes the second molded product.

In contrast, the mold plane 12 of the second die 10 for molding the second molded product constitutes the mold plane 12 of the die 10 for molding the second molded product molded with the thermoplastic non-crystalline or crystalline resin different from the synthetic resin material constituting the first molded product. The mold plane 12 of the second die 10 is constituted by the mold plane 12 of the die 10 adhered with the granules 20 to match and/or harmonize with the glossiness of the surface of the first molded product molded with a thermoplastic crystalline or non-crystalline resin.

Then, the second molded product is molded by the second molding die 10. The second molded product molds the second molded product which is a composite member for adjacently linking to the first molded product to form one structure with a synthetic resin material different from the synthetic resin material which constitutes the first molded product.

Thus, the gloss (luster) value (glossiness) of the first molded product is reduced by the gloss control recesses 112 having fine, uneven surfaces with recesses and projections in which the gloss control projections 28 having the fine, uneven surfaces with recesses and projections of the mold plane 12 of the die 10 are reversed, and the gloss (luster) value (glossiness) is matched or harmonized with the reduced gloss (glossiness) value (gloss level) of the second molded product.

Example 16

The gloss value (glossiness of Gs (60°)) of 1.3 measured according to JIS Z 8741 is regarded as a reference value for the gloss values (glossiness of Gs (60°)) of a first molded product and a second molded product which are adjacently linked composite members.

The die for molding the first molded product is regarded as a composite member example 1, and the die for molding the second molded product is regarded as a composite member example 2.

Composite Member Example 1

The following composite materials (composite materials of Example 1 and 5 to 13) were sprayed on dies in which the mold planes of the injection molding dies with a synthetic resin (polypropylene) were subjected to finishing with leather texture, geometric texture, and pear texture utilizing known etching finishing, followed by sandblast finishing, using a spray gun at an air pressure of about 5 atm at distances to the sprayed surfaces (mold planes) of about 10 to 30 cm (in most cases, about 20 cm).

Composite Material (Composite Material of Example 1):
Composite material in the state in which
60 parts by weight of synthetic resin (epoxy resin),
55 parts by weight of ceramic powder (alumina powder),
9 parts by weight of inorganic fiber (silicon carbide fiber), and
30 parts by weight of solvent (Cellosolve)
were stirred and mixed, diluted with a solvent, and dispersed or dissolved.

For spraying the composite materials of Examples 1 and 5 to 13 by the spray gun, finishing for adhering the granules was performed so that the gloss control projections 28 having diameters of 1 to 50 μm and heights of 5 to 20 μm were at coating rates of 20% and 60%.

Then, the mold plane 12 of the die 10 was heated at 150° C. and thereafter maintained at 150° C. for 2 hours to cure the grains (which formed the granules 20 and the gloss control projections 28) with the composite material sprayed on the mold plane 12 and to adhere the granules 20 to the mold plane 12.

Composite Member Example 2

The following composite materials (composite materials of Example 1 and 5 to 13) were sprayed on dies in which the mold planes of the injection molding dies with a synthetic resin (ABS plastic) were subjected to finishing with leather texture, geometric texture, and pear texture utilizing known etching finishing, followed by sandblast finishing, using a spray gun at an air pressure of about 5 atm at distances to the sprayed surfaces (mold planes) of about 10 to 30 cm (in most cases, about 20 cm).

Composite material (composite material of Example 1):
Composite material in the state in which
60 parts by weight of synthetic resin (epoxy resin),
55 parts by weight of ceramic powder (alumina powder),
9 parts by weight of inorganic fiber (silicon carbide fiber), and
30 parts by weight of solvent (Cellosolve)
were stirred and mixed, diluted with a solvent, and dispersed or dissolved For spraying the composite materials of Examples 1 and 5 to 13 by the spray gun, finishing for adhering the granules was performed so that the gloss control projections 28 having diameters of 1 to 50 μm and heights of 5 to 20 μm were at coating rates of 20% and 60%.

Then, the mold plane 12 of the die 10 was heated at 150° C. and thereafter maintained at 150° C. for 2 hours to cure the grains (which formed the granules 20 and the gloss control projections 28) with the composite material sprayed on the mold plane 12 and to adhere the granules 20 to the mold plane 12.

The gloss values (glossiness of Gs (60°)) of the polypropylene (PP) and ABS resin molded articles obtained by the known injection molding method using the composite member example 1 and the composite member example 2 were measured. Each measurement result is listed in Table 7 (comparison of coating rate and gloss value (glossiness of Gs (60°)).

The gloss values (glossiness of Gs (60°)) of the polypropylene (PP) and the ABS resin were largely different when the coating rate of the composite material was low regardless of the kind of the known emboss finishing, whereas the gloss values (glossiness of Gs (60°)) of both molded articles exhibited the same values when the coating rate was 60%.

TABLE 7

| | Coating Rates 60% | | Coating Rates 20% | |
|---|---|---|---|---|
| | PP | ABS | PP | ABS |
| Leather Texture Pattern | 1.2 | 1.2 | 1.8 | 2.0 |
| Geometric Texture Pattern | 1.3 | 1.3 | 1.8 | 2.2 |
| Pare Texture Pattern | 1.4 | 1.4 | 1.6 | 2.3 |

Example 17

The gloss value (glossiness of Gs (60°)) of 1.3 measured according to JIS Z 8741 is regarded as a reference value for the gloss values (glossiness of Gs (60°)) of a first molded product and a second molded product which are adjacently linked composite members.

The die for molding the first molded product is regarded as a composite member example 3, and the die for molding the second molded product is regarded as a composite member example 4.

Composite Member Example 3

The following composite materials (composite materials of Example 1 and 5 to 13) were sprayed on dies in which the mold planes of the injection molding dies with a synthetic resin (polypropylene) were subjected to finishing with leather texture, geometric texture, and pear texture utilizing known etching finishing, followed by sandblast finishing, using a spray gun at an air pressure of about 5 atm at distances to the sprayed surfaces (mold planes) of about 10 to 30 cm (in most cases, about 20 cm).

Composite material (composite material of Example 1):
Composite material in the state in which
60 parts by weight of synthetic resin (epoxy resin),
55 parts by weight of ceramic powder (alumina powder),
9 parts by weight of inorganic fiber (silicon carbide fiber), and
30 parts by weight of solvent (Cellosolve)
were stirred and mixed, diluted with a solvent, and dispersed or dissolved.

For spraying the composite materials of Examples 1 and 5 to 13 by the spray gun, finishing for adhering the granules was performed so that the gloss control projections 28 having diameters of 1 to 50 μm and heights of 5 to 20 μm were at coating rates of 20% and 60%.

Then, the mold plane 12 of the die 10 was heated at 150° C. and thereafter maintained at 150° C. for 2 hours to cure the grains (which formed the granules 20 and the gloss control projections 28) with the composite material sprayed on the mold plane 12 and to adhere the granules 20 to the mold plane 12.

Composite Member Example 4

The following composite materials (composite materials of Example 1 and 5 to 13) were sprayed on dies in which the mold planes of the injection molding dies with a synthetic resin (polystyrene (PS)) were subjected to finishing with leather texture, geometric texture, and pear texture utilizing known etching finishing, followed by sandblast finishing, using a spray gun at an air pressure of about 5 atm at distances to the sprayed surfaces (mold planes) of about 10 to 30 cm (in most cases, about 20 cm).

Composite material (composite material of Example 1):
Composite material in the state in which
60 parts by weight of synthetic resin (epoxy resin),
55 parts by weight of ceramic powder (alumina powder),
9 parts by weight of inorganic fiber (silicon carbide fiber), and
30 parts by weight of solvent (Cellosolve)
were stirred and mixed, diluted with a solvent, and dispersed or dissolved.

For spraying the composite materials of Examples 1 and 5 to 13 by the spray gun, finishing for adhering the granules was performed so that the gloss control projections 28 having diameters of 1 to 50 μm and heights of 5 to 20 μm were at coating rates of 20% and 60%.

Then, the mold plane 12 of the die 10 was heated at 150° C. and thereafter maintained at 150° C. for 2 hours to cure the grains (which formed the granules 20 and the gloss control projections 28) with the composite material sprayed on the mold plane 12 and to adhere the granules 20 to the mold plane 12.

The results, in which, using the dies 10 in which the composite material of Example 1 was finished so that the gloss control projections 28 of 1 to 50 μm in diameter and 5 to 20 μm in height were at coating rates of 20%, 60%, and 95%, the first molded product was molded with PP resin using the known molding method, separately, the second molded products were molded with ABS resin and polystyrene (PS) for molding the second molded product to be the composite member, and the gloss values (glossiness of Gs (60°)) of the first molded article (PP resin) and the second molded articles (ABS resin and polystyrene (PS)) which were obtained were measured, are listed in Table 8 (comparison of coating rate and gloss value (glossiness of Gs (60°))). It was exhibited that the gloss values (glossiness of Gs (60°)) were the same values in the case of the coating rate of 60%. When the coating rate was high or the coating rate was low, the gloss values (glossiness of Gs (60°)) were not the same.

TABLE 8

|  | PP | ABS | PS |
|---|---|---|---|
| Coating Rates 95% | 1.8 | 2.0 | 2.0 |
| Coating Rates 60% | 1.2 | 1.2 | 1.2 |
| Coating Rates 20% | 1.8 | 2.0 | 3.0 |

The dies 10 subjected to the emboss finishing by the known etching finishing and sandblast finishing were spray-finished so that the composite materials of Examples 1 and 5 to 13 were controlled and the gloss control projections 28 of 1 to 50 μm in diameter and 5 to 20 μm in height were at a coating rate of 60%. The emboss of substrates were leather, geometric, and pear texture.

The gloss values (glossiness of Gs (60°)) of the respective molded articles with PP, ABS, and PS obtained by the known injection molding method from the respective dies 10 were measured at two places. The gloss values (glossiness of Gs (60°)) were measured according to JIS Z 8741 using the glossmeter (trade name: UNI GLOSS 60 GM-60) manufactured by Konica Minolta.

The measurement results of the PP molded article and the ABS molded article are listed in Table 9-1 (comparison of glossiness of gloss values (Gs (60°))).

TABLE 9-1

| Type of Emboss patterns | | PP Molded Article | | ABS Molded Article | |
|---|---|---|---|---|---|
| Leather Texture Pattern | Prior to the Performance | 1.8 | 2.0 | 2.0 | 2.4 |
| | Example 16 (1.5~13) | 1.2 | 1.3 | 1.3 | 1.3 |
| Geometric Texture Pattern | Prior to the Performance | 1.4 | 2.0 | 2.0 | 2.3 |
| | Example 16 (1.5~13) | 1.0 | 1.2 | 1.2 | 1.3 |
| Pare Texture Pattern | Prior to the Performance | 1.4 | 1.8 | 1.8 | 2.2 |
| | Example 16 (1.5~13) | 1.0 | 1.2 | 1.2 | 1.3 |

The measurement results of the PP molded article and the PS molded article are listed in Table 9-2 (comparison of glossiness of gloss values (Gs (60°))).

TABLE 9-2

| Type of Emboss patterns | | PP Molded Article | | pS Molded Article | |
|---|---|---|---|---|---|
| Leather Texture Pattern | Prior to the Performance | 1.8 | 1.9 | 2.3 | 2.4 |
| | Example 17 (1.5~13) | 1.2 | 1.2 | 1.3 | 1.3 |
| Geometric Texture Pattern | Prior to the Performance | 1.4 | 1.5 | 2.2 | 2.3 |
| | Example 17 (1.5~13) | 1.0 | 1.0 | 1.2 | 1.3 |
| Pare Texture Pattern | Prior to the Performance | 1.4 | 1.3 | 2.3 | 2.2 |
| | Example 17 (1.5~13) | 1.0 | 1.0 | 1.2 | 1.3 |

The gloss values (glossiness of Gs (60°)) of the molded articles prior to the performance were reduced by approximately about 0.5 to 1.0 by performing this finishing, without depending on the gloss values (glossiness of Gs (60°)) prior to the performance. The gloss values (glossiness of Gs (60°)) after the performance can be matched by equivalently controlling the gloss values (glossiness of Gs (60°)) prior to the performance.

The different synthetic resin materials constituting a composite structure include, for example, the following ones.

Thermoplastics with which the first molded product is molded include polyacetal resins, polyamide resins, polyethylene resins, polypropylene resins, fluorine resins, and the like, which are crystalline plastics.

Thermoplastics with which the second molded product is molded include ABS resins, AS resins, acrylic resins, polycarbonate resins, vinyl chloride resins, and the like, which are non-crystalline plastics.

Window glare must be prevented in automotive interior components, especially window peripheries such as dash boards (instrument panels), their components, and pillars, and a synthetic resin molded article 110 having a gloss value (glossiness of Gs (60°)) of around 1.3 or less measured according to RS Z 8741 is demanded.

In conventional pear finishing or sandblast finishing with etching emboss, a demanded gloss value (glossiness of Gs (60°)) must be realized over the whole surface of the mold plane 12 of the die 10, and it has been very difficult to continuously maintain the gloss value (glossiness of Gs (60°)).

In addition, a molded article has been conventionally painted to realize a desired gloss value (glossiness of Gs (60°)) because the gloss value (glossiness of Gs (60°)) is increased with increasing the number of molding shots.

Also, it has been impossible to realize similar gloss values (glossiness of Gs (60°)) with an ABS resin and polypropylene (PP) by gloss reduction finishing with etching emboss. However, similar gloss values (glossiness of Gs (60°)) can be achieved with polypropylene (PP), an ABS resin, and polystyrene (PS) by molding by this die 10.

The method for matching glossiness exhibits excellent effects as follows.

The glossiness of a molded article is determined by recesses and projections formed on the molded article. Accordingly, the glossiness of the obtained molded article is determined depending on whether complicated, fine recesses and projections formed on a die can be reversely molded on the molded article.

Thus, for matching the glossinesses of molded articles with different materials, it is necessary to form gloss control granules which have optimum materials, optimum sizes, and optimum spacings, similarly enabling reverse molding of recesses and projections without depending on the molding materials. The sizes of the grains of the gloss control granules are determined by the blending and spraying conditions of the materials.

It has been difficult to form a complicated, fine surface with recesses and projections, as specified in the present invention, by conventional etching finishing or sandblast finishing. Even in the case of enabling the formation, the recesses and projections have not been able to be similarly reversely molded (occurrence of galling, and whitening) by changing the molding material.

Furthermore, since the outermost surface in the inner surface of this mold for molding a resin is formed to have a shape with fine recesses and projections, a gas, air, and/or the like, generated during injection molding, can be derived from between the recesses and the projections to an air vent. In addition, the gas or air with escape cut off is derived into the gaps of the recesses and the projections. Thereby, disturbance of the flowability of a molten resin by the gas or the air does not occur, and the complicated, fine recesses and projections formed on the die can be reversely molded.

A pear-like pattern is formed on a resin surface by the fine recesses and projections of the granules 20, so that a resin molded article having a delustered surface can be obtained. As described above, a resin molded article having a surface with poor luster can be obtained by using this mold for molding a resin.

Generally, when injection-molding is performed using a resin molding die, a gas and/or the like is often adhered to the mold plane 12 of the die 10 to increase a luster, for example, even if the mold plane 12 of the die 10 is finished by a sandblast or the like and delustered. However, when injection-molding or the like is performed using such a molding die 10 according to this invention, a molded article with a maintained initial gloss value (gloss level) can be molded without increasing a luster for a long term.

The invention claimed is:

1. A molding die, comprising:
a die having a mold plane; and
gloss control granules comprised of:
50 to 80 parts by weight of a shape retention fixation base material that is a thermosetting resin;
30 to 80 parts by weight of a diffuse reflecting surface formation core material that is a ceramic powder having a shape that is random; and
5 to 10 parts by weight of a roughness enhancement material that is an inorganic fiber, adhered to the mold plane of the die in a spaced-apart manner;
wherein the gloss control granules are each independently adhered in the spaced-apart manner to form gloss control projections on the mold plane of the die so that a surface of a molded product molded on the mold plane of the die adhered with the gloss control granules forms a surface having a reflection that is a small specular reflection or a diffuse reflection, and
wherein the gloss control projections having fine, uneven surfaces with recesses and projections are formed on the mold plane at a coating rate of 40 to 80%.

2. The molding die according to claim 1, wherein the gloss control granule has a grain diameter of 1.0 to 100 μm and a height of 5 to 30 μm.

3. The molding die according to any of claim 1, wherein the die has a surface region other than that with the gloss control projections having the fine, uneven surfaces with recesses and projections; and a recesses-and-projections-like pattern of the mold plane of the die appears between the respective gloss control granules.

4. A molding die, comprising:
a die having a mold plane; and
gloss control granules comprised of:
50 to 80 parts by weight of a shape retention fixation base material that is a thermosetting resin;
30 to 80 parts by weight of a diffuse reflecting surface formation core material that is a ceramic powder having a shape that is random; and
5 to 10 parts by weight of a roughness enhancement material that is an inorganic fiber, adhered to the mold plane of the die in a spaced-apart manner,
wherein the gloss control granules are each independently adhered in a spaced-apart manner to form gloss control projections on the mold plane of the die so that a surface of a molded product molded on the mold plane of the die adhered with the gloss control granules forms a surface having a reflection that is a small specular reflection or a diffuse reflection, and
wherein the gloss control projections have fine, uneven surfaces with recesses and projections, have strength for enduring molding, are formed with the shape retention fixation base material, have bodies that have different shapes including approximately bell-like bodies, approximately hanging bell-like bodies, approximately discal bodies, approximately dice-like bodies, approximately hemispheroidal bodies, approximately oblate-hemispheroidal bodies, approximately prolate-hemispheroidal bodies cut along planes crossing spherical surfaces having spherical, ellipsoidal, and cocoon shapes, and polyhedrons including truncated cubes, cuboctahedrons, and twisted cubes are formed, and have fine projections protruding from the differently shaped bodies formed of at least one of the roughness enhancement material and the diffuse reflecting surface formation core material.

5. The molding die according to claim 4, wherein the gloss control granule has a grain diameter of 1.0 to 100 μm and a height of 5 to 30 μm.

6. The molding die according to claim 4, wherein the die has a surface region other than that with the gloss control projections having the fine, uneven surfaces with recesses and projections, and the mold plane of the die has a recesses-and-projections-like pattern that appears between the respective gloss control granules.

7. A molding die, comprising:
a die having a mold plane; and
gloss control granules comprised of:
from 50 to 80 parts by weight of a shape retention fixation base material including a thermosetting plastic;
from 30 to 80 parts by weight of a diffuse reflecting surface formation core material including a ceramic powder having a random shape to increase surface area, to increase surface roughness, and to raise surface recesses and surface projections, and
from 5 to 10 parts by weight of a roughness enhancement material including an inorganic fiber to form a diffuse reflecting surface by which incident light is diffused in every direction, and having have a grain diameter of 1.0 to 100 μm, having a height of 5 to 30 μm;

wherein the gloss control granules are adhered to the mold plane of the die by spraying using a spray gun in a spaced-apart manner at spacings of from 0.1 to 500 μm, and are each independently adhered in the spaced-apart manner to form gloss control projections by curing the gloss control granules on the mold plane of the die so that a molded product molded on the mold plane of the die adhered with the gloss control granules has a surface having a reflection that is a small specular reflection or a diffuse reflection, wherein the gloss control projections formed by the shape retention fixation base material are comprised of the gloss control granules and adhere the gloss control granules to the surface of the mold plane of the die, wherein in the gloss control projections have fine, uneven surfaces with recesses and projections, have bodies having different shapes formed of the shape retention fixation base material, and have fine projections protruding from the bodies formed of at least one of the roughness enhancement material and the diffuse reflecting surface formation core material, and the gloss control projections do not melt at least at temperatures of 150° C. and below, and wherein the gloss control granules are formed on the mold plane at a coating rate of 40 to 80%.

8. The molding die according to claim 7, wherein the gloss control granules are formed by spray-solidifying a composite material in which 50 to 80 parts by weight of a synthetic resin, 30 to 80 parts by weight of a ceramic powder, and 5 to 10 parts by weight of an inorganic fiber are diluted with 30 to 90 parts by weight of a diluting solvent.

9. A molding die, comprising:
a die having a mold plane; and
gloss control granules comprised of:
50 to 80 parts by weight of a shape retention fixation base material including a thermosetting plastic;
30 to 80 parts by weight of a diffuse reflecting surface formation core material including a ceramic powder having a random shape to increase a surface area, to increase surface roughness, and to raise the recesses and projections of the surface; and
5 to 10 parts by weight of a roughness enhancement material including an inorganic fiber to form a diffuse reflecting surface by which incident light is diffused in every direction, wherein the gloss control granules are adhered to the mold plane of the die by spraying using a spray gun in a spaced-apart manner at spacings of from 0.1 to 500 μm, have a grain diameter of 1.0 to 100 μm, have a height of 5 to 30 μm, and are each independently adhered in the spaced-apart manner to form gloss control projections by curing the gloss control granules on the mold plane of the die so that a molded product molded on the mold plane of the die adhered with the gloss control granules forms a surface having a reflection that is a small specular reflection or a diffuse reflection;

wherein the shape retention fixation base material forms the gross control granules constituting the gloss control projections, and is intended to adhere the gloss control granules to the mold plane of the die;

wherein the gloss control projections have fine, uneven surfaces with recesses and projections, have strength for enduring molding, are formed of the shape retention fixation base material, have bodies that are differently shaped including approximately bell-like bodies, approximately hanging bell-like bodies, approximately discal bodies, and approximately dice-like bodies, approximately hemispheroidal bodies, approximately oblate-hemispheroidal bodies, and approximately prolate-hemispheroidal bodies cut along planes crossing spherical surfaces having spherical, ellipsoidal, and cocoon shapes, and polyhedrons including truncated cubes, cuboctahedrons, and twisted cubes, and have fine projections protruding from the bodies formed of at least one of the roughness enhancement material and the diffuse reflecting surface formation core material, and the gloss control projections do not melt at least at temperatures of 150° C. and below, and wherein the gloss control granules are formed on the mold plane at a coating rate of 40 to 80%.

10. The molding die according to claim 9, wherein the gloss control granules are formed by spray-solidifying a composite material in which 50 to 80 parts by weight of a synthetic resin, 30 to 80 parts by weight of a ceramic powder, and 5 to 10 parts by weight of an inorganic fiber are diluted with 30 to 90 parts by weight of a diluting solvent.

11. A molding die, comprising:
a die having a mold plane; and
gloss control granules comprised of:
50 to 80 parts by weight of a thermosetting plastic;
30 to 80 parts by weight of a ceramic powder; and
5 to 10 parts by weight of an inorganic fiber, adhered to the mold plane of the die in a spaced-apart manner, wherein the gloss control granules are adhered so that a molded product molded on the mold plane of the die adhered with the gloss control granules has a surface having a gloss level that at least one of matches and harmonizes with that of another molded product, and wherein the gloss control granules have gloss control projections having fine, uneven surfaces with recesses and projections formed on the mold plane at a coating rate of 40 to 80%.

12. The molding die according to claim 11 wherein the gloss control granules have a grain diameter of 1.0 to 100 μm and a height of 5 to 30 μm.

13. The molding die according to claim 11, wherein the die has a surface region other than that with the gloss control projections having the fine, uneven surfaces with recesses and projections, and a recesses-and-projections-like pattern of the mold plane of the die appears between the respective gloss control granules.

14. A molding die array, comprising:
a plurality of dies having respective mold planes for molding molded products composed of different synthetic resin materials and being positioned adjacent to each other; and
gloss control granules provided on at least one mold plate of the plurality of dies and being comprised of:
50 to 80 parts by weight of a shape retention fixation base material including a thermosetting plastic,
30 to 80 parts by weight of a diffuse reflecting surface formation core material including a ceramic powder having a shape that is random to increase surface area, to increase surface roughness, and to raise recesses and projections of the surface, and
5 to 10 parts by weight of a roughness enhancement material including an inorganic fiber to form a diffuse reflecting surface by which incident light is diffused in every direction, and having a grain diameter of 1.0 to 100 µm and a height of 5 to 30 µm,
  wherein the gloss control granules are adhered to at least one mold plane by spraying using a spray gun in a spaced-apart manner at spacings of from 0.1 to 500 µm, and are each independently adhered in the spaced-apart manner to form gloss control projections by curing the gloss control granules on the at least one mold plane so that a molded product molded on the mold plane of the die adhered with the gloss control granules has a surface that has a reflection that is a small specular reflection or a diffuse reflection,
  wherein the shape retention fixation base material forms the gross control granules constituting the gloss control projections, and is intended to adhere the gloss control granules to the surface of the mold plane of the die, and
  wherein the gloss control granules are added so that a first molded product molded on the mold plane adhered with the gloss control granules has a surface having a gloss level that at least one of matches and harmonizes with that of a different and other adjacent molded product,
  wherein the gloss control projections have fine, uneven surfaces with recesses and projections, have bodies having different shapes formed with the shape of the retention fixation base material, and have fine projections protruding from the bodies formed of at least one of the roughness enhancement material and the diffuse reflecting surface formation core material, and the gloss control projections do not melt at least at temperatures of 150° C. and below, and
  wherein the gloss control granules are formed on the at least one mold plate at a coating rate of 40 to 80%.

15. The molding die array according to claim 14, wherein the gloss control granules are formed by spray-solidifying a composite material in which 50 to 80 parts by weight of a synthetic resin, 30 to 80 parts by weight of a ceramic powder, and 5 to 10 parts by weight of an inorganic fiber are diluted with 30 to 90 parts by weight of a diluting solvent.

16. A method for manufacturing a molding die, comprising, in the order recited:
  (a) performing finishing on a molding die having a mold plane for forming a recesses-and-projections-like pattern on the molding die;
  (b) mixing 50 to 80 parts by weight of a shape retention fixation base material that is a thermosetting resin; 30 to 80 parts by weight of a diffuse reflecting surface formation core material that is a ceramic powder having a shape that is random; 5 to 10 parts by weight of a roughness enhancement material that is an inorganic fiber; and 30 to 90 parts by weight of a solvent to provide a composite material mixture;
  (c) spraying the composite material mixture as a fine liquid mist onto the mold plane of the die by compressed air at a coating rate of 40 to 80% to provide a composite material coated mold plane;
  (d) heating the composite material coated mold plane at a temperature of 100 to 150° C. to provide partial adhesion of the composite material thereon and add gloss control granules having fine, uneven surfaces with recesses and projections at a coating rate of 40 to 80% thereon, so that a molded product molded on the mold plane of the die adhered with the gloss control granules has a surface having reflection that is one of a small specular reflection or a diffuse reflection, and the gloss control projections have fine, uneven surfaces with recesses and projections formed at the coating rate of 40 to 80% on the mold plane.

17. The method for manufacturing a molding die according to claim 16, wherein the gloss control granules have a grain diameter of 1.0 to 100 µm and a height of 5 to 30 µm.

18. The method for manufacturing a molding die according to claim 16, wherein the die has a surface region other than that with the gloss control projections having the fine, uneven surfaces with recesses and projections, and the mold plane of the die has a recesses-and-projections-like pattern that appears between the respective gloss control granules.

19. A method for manufacturing a molding die, comprising, in the order recited:
  (a) performing finishing on a molding die having a mold plane for forming a recesses-and-projections-like pattern on the molding die;
  (b) mixing 50 to 80 parts by weight of a shape retention fixation base material that is a thermosetting plastic, 30 to 80 parts by weight of a diffuse reflecting surface formation core material that is a ceramic powder having a shape that is random, 5 to 10 parts by weight of a roughness enhancement material that is an inorganic fiber, and 30 to 90 parts by weight of a solvent to provide a composite material mixture;
  (c) spraying the composite material mixture as a fine liquid mist onto the mold plane of the die by compressed air at a coating rate of 40 to 80% to provide a composite material coated mold plane; and
  (d) heating the composite material coated mold plane at a temperature of 100 to 150° C. to solidify the composite material sprayed on the mold plane and add gloss control granules having fine, uneven surfaces with recesses and projections at a coating rate of 40 to 80% on the mold plane,
  wherein a first molded product and a second molded product have respective gloss levels that are compared and are at least one of matched and harmonized by adjusting the added gloss control granules in at least one of the first molded product and the second molded product.

20. The method for manufacturing a molding die according to claim 19, wherein the gloss control granule has a grain diameter of 1.0 to 100 µm and a height of 5 to 30 µm.

\* \* \* \* \*